United States Patent
Ueno et al.

[11] Patent Number: 6,047,311
[45] Date of Patent: Apr. 4, 2000

[54] AGENT COMMUNICATION SYSTEM WITH DYNAMIC CHANGE OF DECLARATORY SCRIPT DESTINATION AND BEHAVIOR

[75] Inventors: Tsuyoshi Ueno; Masato Ishikawa; Hideki Yasukawa, all of Tokyo, Japan

[73] Assignee: Matsushita Electric Industrial Co., Ltd., Osaka, Japan

[21] Appl. No.: 08/892,282

[22] Filed: Jul. 14, 1997

[30] Foreign Application Priority Data

Jul. 17, 1996 [JP] Japan ................................ 8-187160

[51] Int. Cl.[7] .................................................. G06F 13/00
[52] U.S. Cl. ...................... 709/202; 709/201; 709/206
[58] Field of Search .............................. 705/8; 709/201, 709/206, 202; 707/501, 502

[56] References Cited

U.S. PATENT DOCUMENTS

| | | | |
|---|---|---|---|
| 5,802,253 | 9/1998 | Gross et al. | 709/206 |
| 5,809,512 | 9/1998 | Kato | 707/502 |
| 5,870,768 | 2/1999 | Hekmatpour | 707/501 |
| 5,878,398 | 3/1999 | Tokuda et al. | 705/8 |

FOREIGN PATENT DOCUMENTS 4-236542  8/1992  Japan .

OTHER PUBLICATIONS

Magedanz Et. Al., "Mobile Software Agents : A New Paradigm for Telecommunications Management", Network Operations and Management Symposium, 1996, IEEE, pp. 360–369, vol. 2, Apr. 1996.

*Primary Examiner*—Zarni Maung
*Assistant Examiner*—Philip B. Tran
*Attorney, Agent, or Firm*—Lowe Hauptman Gopstein Gilman & Berner

[57] ABSTRACT

The present invention provides an agent communication system, which can reduce special environment as far as possible, can interactively communicate with users, can cope with dynamic situations and can operate intelligently. The electronic mail passes through electronic mail delivery means 103 and electronic mail storage means 104. Agent mail storage means 104 recognizes an agent mail, and at its notification, scriptizing means 106 converts the mail to a script, and the script is stored in script storage means 107. Script executing means 108 executes the script and an instruction from user input means 101, and it is outputted to output means 109. Then, at a notification of the script executing means 108, electronic mail preparing means 102 prepares an electronic mail, and it is distributed to the electronic mail delivery means 103.

17 Claims, 32 Drawing Sheets

Name of describer:

Address of transmitting destination: 1, 2, ····

Title name: Agent

Behavioral description:

Knowledge description:

Data (document, image, sound)

FIG. 3

(a)　From:　　tsuyoshi@trl.mei.co.jp
　　Subject:　Agent
　　Date:　　Mon, 08 Jan 1996 18:00:00 JST
　　To:　　　ueno@trl.mei.co.jp
　　agentscript>
　　　　id> 10001 <id
　　　　image>
　　　　　　　image1: encoded image data 1
　　　　　　　image2: encoded image data 2
　　　　<image
　　　　knowledge>
　　　　　　　address: yamamoto@trl.mei.co.jp,
　　　　　　　　　　　　hideki@trl.mei.co.jp,
　　　　　　　　　　　　tsuyoshi@trl.mei.co.jp
　　　　<knowledge
　　　　rule>
　　　　　　　display("How is it convenient on January 10 ?")
　　　　　　　input(text)
　　　　　　　text="go_next"　-> get_next(address), go
　　　　　　　text="yes"　　　-> display(image1),write(yes)
　　　　　　　text="no"　　　 -> display(image2),write(no)
　　　　　　　text=?　　　　　-> add(rule,"?->hear(?)")
　　　　<rule
　　<agentscript (b)　From:　　　　　Name of describer
　　Subject:　　　 Title name
　　Date:　　　　　 Date of transmission
　　To:　　　　　　 Address of transmitting destination
　　agentscript>　Agent data　<agentscript
　　id>　　　　　　 ID number <id
　　image>　　　　 Encoded image data <image
　　knowledge>　　 Knowledge description <knowledge
　　rule>　　　　　Behavioral description <rule

FIG. 5

Image file 1        (image1) :
    Decoded image data 1
Image file 2        (image2) :
    Decoded image data 2

Knowledge base file,:
    address: yamamoto@trl.mei.co.jp,
             hideki@trl.mei.co.jp,
             tsuyoshi@trl.mei.co.jp Rule base file
    display("How is it convenient on January 10 ?")
    input(text)
    text="go_next"  -> get_next(address),go
    text="yes"     -> display(image1),write(yes)
    text="no"      -> display(image2),write(no)
    text=?        -> add(rule,"?->hear(?)")

FIG. 6

○ From: ueno@trl.mei.co.jp
   Subject: Agent
   Date: Mon, 08 Jan 1996 18:00:00 JST
○ To: yamamoto@trl.mei.co.jp

```
agentscript> id> 10001 <id
        image>
                  image1: encoded image data 1
                  image2: encoded image data 2
        <image
        knowledge>
                  address: yamamoto@trl.mei.co.jp,
                           hideki@trl.mei.co.jp,
                           tsuyoshi@trl.mei.co.jp
                  yes:ueno
        <knowledge
        rule>
                  display("How is it convenient on January 10 ?")
                  input(text)
                  text="go_next"   -> get_next(address),go
                  text="yes"       -> display(image1),write(yes)
                  text="no"        -> display(image2),write(no)
                  text="$name: not present"  -> delete(address,$name)
                  text=?           -> add(rule,"?->hear(?)")
           <rule
      <agentscript
```

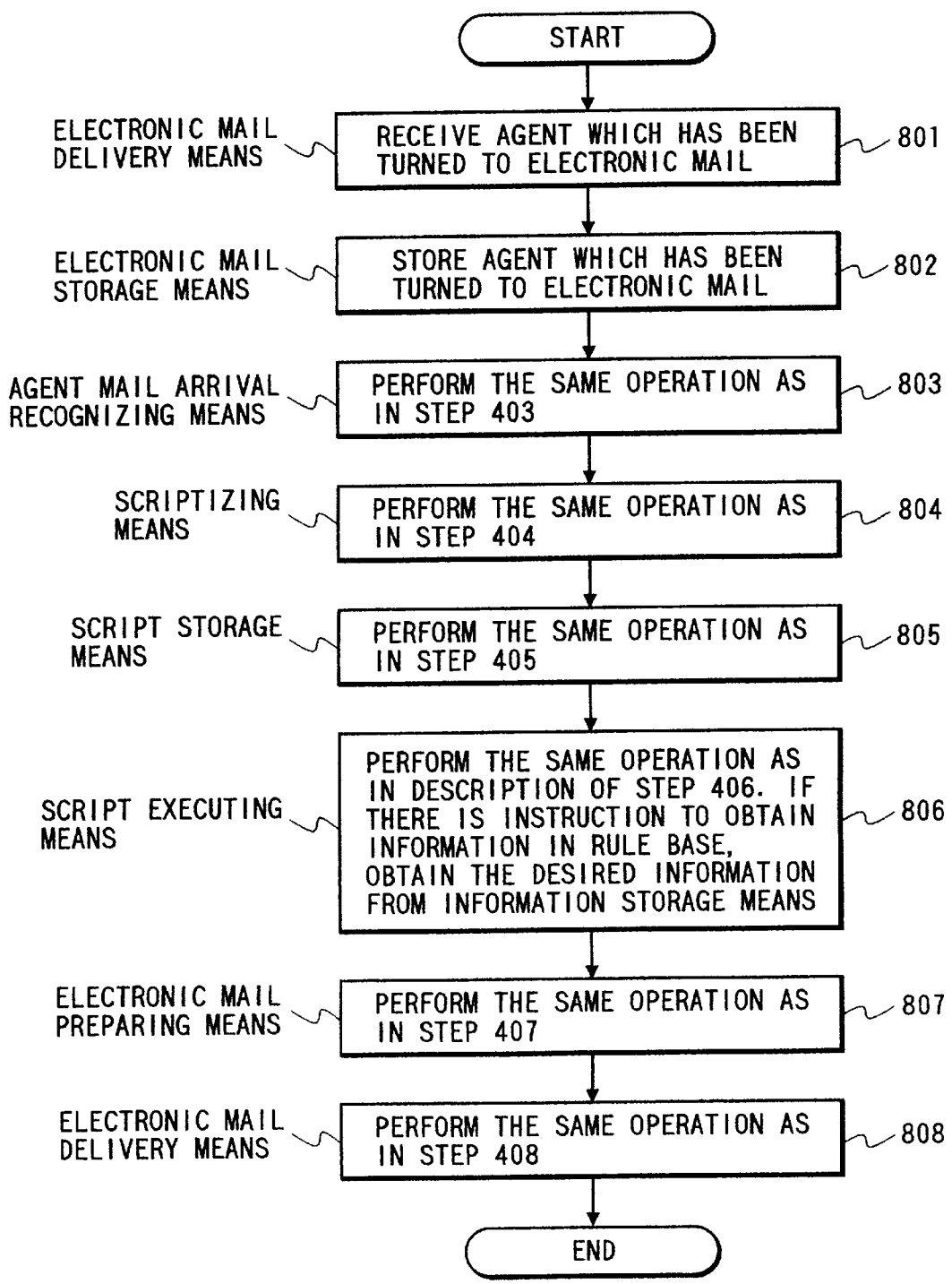

FIG. 9

○ From: tsuyoshi@trl.mei.co.jp
   Subject: Agent
   Date: Mon, 08 Jan 1996 18:00:00 JST
○ To: ueno@trl.mei.co.jp

```
agentscript>
       id> 10001 <id
       image>
              image1: encoded image data 1
              image2: encoded image data 2
       <image
       knowledge>
              address: yamamoto@trl.mei.co.jp,
                       hideki@trl.mei.co.jp,
                       tsuyoshi@trl.mei.co.jp
       <knowledge
       rule>
              display("How is it convenient on January 10 ?")
              input(text)
              text="go_next"  -> get_next(address),go
           ○ time=10        -> get_information_from
                                ("/tmp/schedule"),go
              text=?          -> add(rule,"?->hear(?)")
       <rule
<agentscript
```

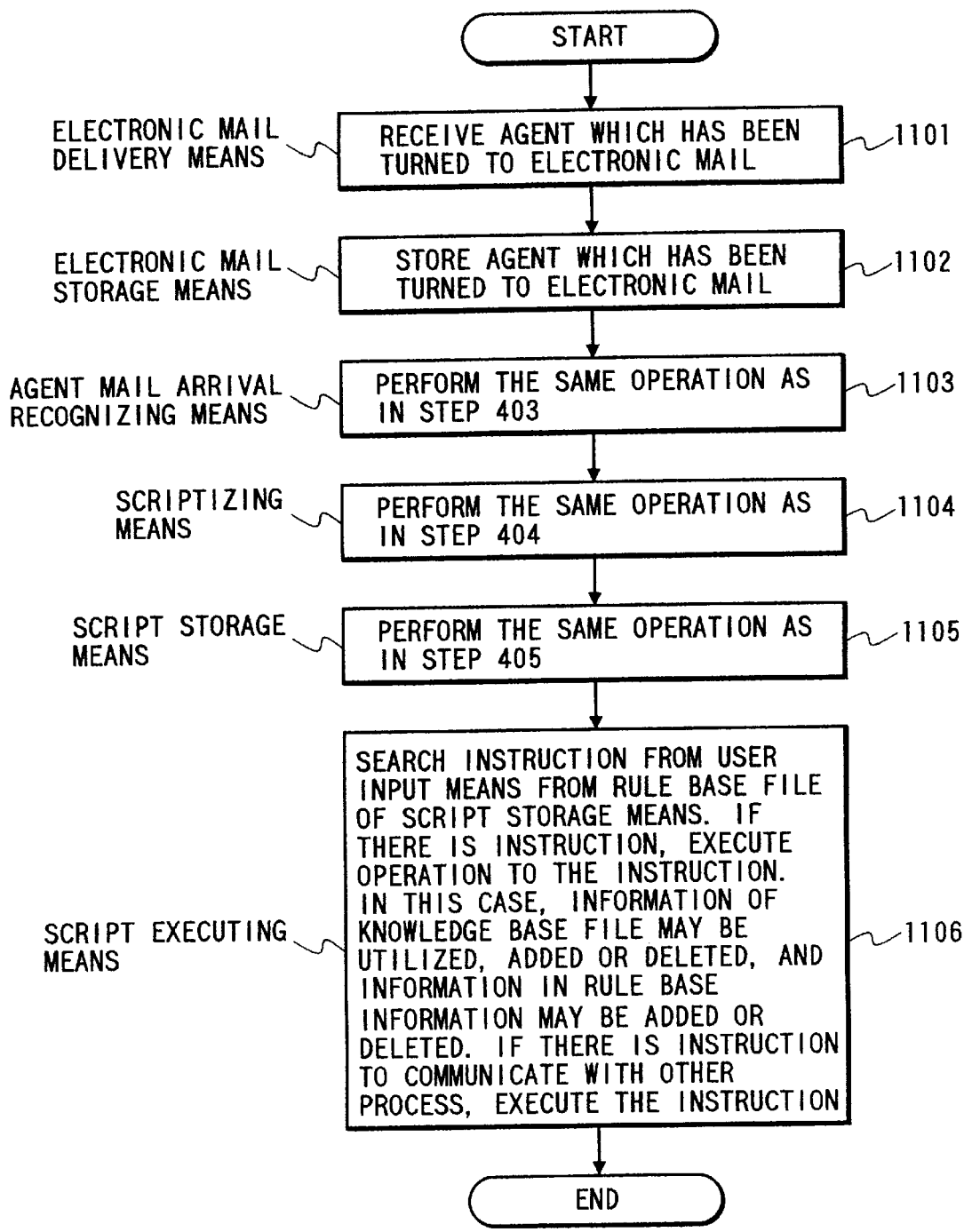

FIG. 12

From: tsuyoshi@trl.mei.co.jp
Subject: Agent
Date: Mon, 08 Jan 1996 18:00:00 JST
To: ueno@trl.mei.co.jp

```
agentscript>
        id> 10001 <id
        image>
                image1: encoded image data 1
                image2: encoded image data 2
        <image
        knowledge>
                address: yamamoto@trl.mei.co.jp,
                         hideki@trl.mei.co.jp,
                         tsuyoshi@trl.mei.co.jp
  O             hostname: oliver
  O             port: 3000
        <knowledge
        rule>
                display("How is it convenient on January 10 ?")
                input(text)
                text="go_next"  -> get_next(address),go
                text="yes"      -> display(image1),write(yes)
                text="no"       -> display(image2),write(no)
                text="$name: not present" ->delete(address,$name)
  O             text="talk"    -> connect(hostname,port),send(text)
                text=?          -> add(rule,"?->hear(?)")
        <rule
<agentscript
```

FIG. 15

```
From:    tsuyoshi@trl.mei.co.jp
Subject: Agent
Date:    Mon, 08 Jan 1996 18:00:00 JST
To:      ueno@trl.mei.co.jp agentscript>
    id> 10001 <id
    image>
            image1: encoded image data 1
            image2: encoded image data 2
    <image
    knowledge>
            address: yamamoto@trl.mei.co.jp,
                     hideki@trl.mei.co.jp,
                     tsuyoshi@trl.mei.co.jp
    <knowledge
    rule>
            display("How is it convenient on January 10 ?")
            input(text)
            text="go_next"  -> get_next(address),go
            text="yes"      -> display(image1),write(yes)
            text="no"       -> display(image2),write(no)
            text=?          -> add(rule,"?->hear(?)")
    <rule
    id> 10002 <id
    image>
            image1: encoded image data 1
            image2: encoded image data 2
    <image
    knowledge>
                     tsuyoshi@trl.mei.co.jp
    <knowledge
    rule>
            display("Would you like to go to play tennis tomorrow ?")
            input(text)
            text="go_next"  -> get_next(address),go
            text="yes"      -> display(image1),write(yes)
            text="no"       -> display(image2),write(no)
            text=?          -> add(rule,"?->hear(?)")
    <rule
<agentscript
```

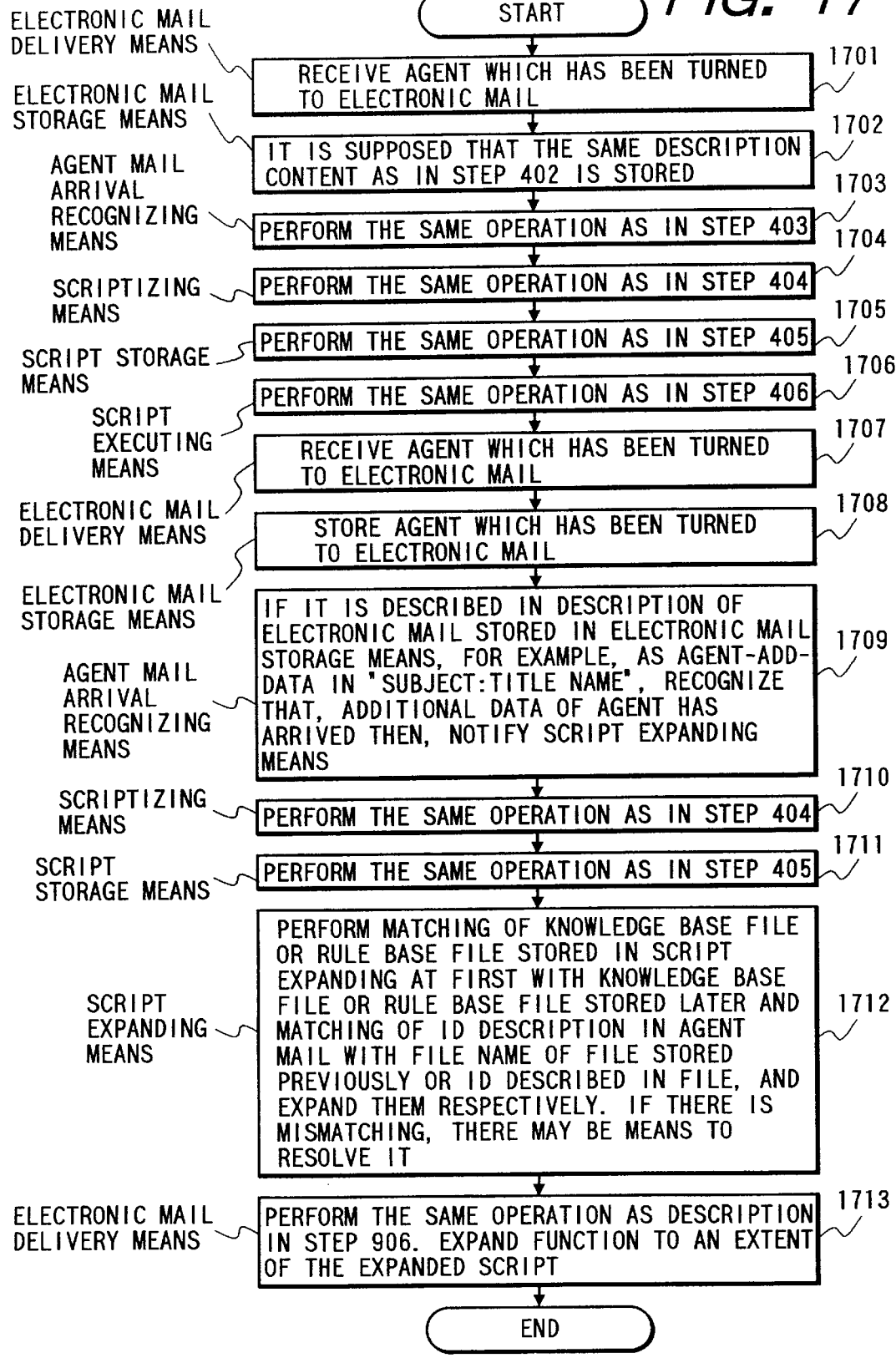

FIG. 18

```
From:     tsuyoshi@trl.mei.co.jp
Subject:  Agent-Add-Data
Date:     Mon, 08 Jan 1996 18:00:00 JST
To:       ueno@trl.mei.co.jp agentscript>
    id> 10001 <id
    image>
              image3: encoded image data 3
    <image
    knowledge>
              address: saeki@trl.mei.co.jp,
                       fujita@trl.mei.co.jp,
                       okada@trl.mei.co.jp,
                       ohtu@trl.mei.co.jp <knowledge
    rule>
              text="?"    -> disply(image3),write(?)
              text="$name: not present"   ->delete(address,$name)
              text="$name: participation" ->add(address,$name)
    <rule
<agentscript
```

FIG. 19

```
Image file 1          (image1) :
    Decoded image data 1
Image file 2          (image2) :
    Decoded image data 2
Image file 3          (image3) :
    Decoded image data 3

Knowledge base file :
    address: yamamoto@trl.mei.co.jp,
             hideki@trl.mei.cd.jp,
             tsuyoshi@trl.mei.co.jp
             saeki@trl.mei.co.jp
             fujita@trl.mei.co.jp
             okada@trl.mei.co.jp
             ohtu@trl.mei.co.jp Rule base file
    display("How is it convenient on January 10 ?")
    input(text)
    text="go_next"  -> get_next(address),go
    text="yes"      -> display(image1),write(yes)
    text="no"       -> display(image2),write(no)
    text=?          -> add(rule,"?->hear(?)")
    text="?"        -> display(image3),wrire(?)
    text="$name: not present"    ->delete(address,$name)
    text="$name: participation"  ->add(address,$name)
```

Knowledge base file:
    address: yamamoto@trl.mei.co.jp,
               hideki@trl.mei.co.jp,
               tsuyoshi@trl.mei.co.jp,
               saeki@trl.mei.co.jp,
               fujita@trl.mei.co.jp,
               okada@trl.mei.co.jp,
               ohtu@trl.mei.co.jp,

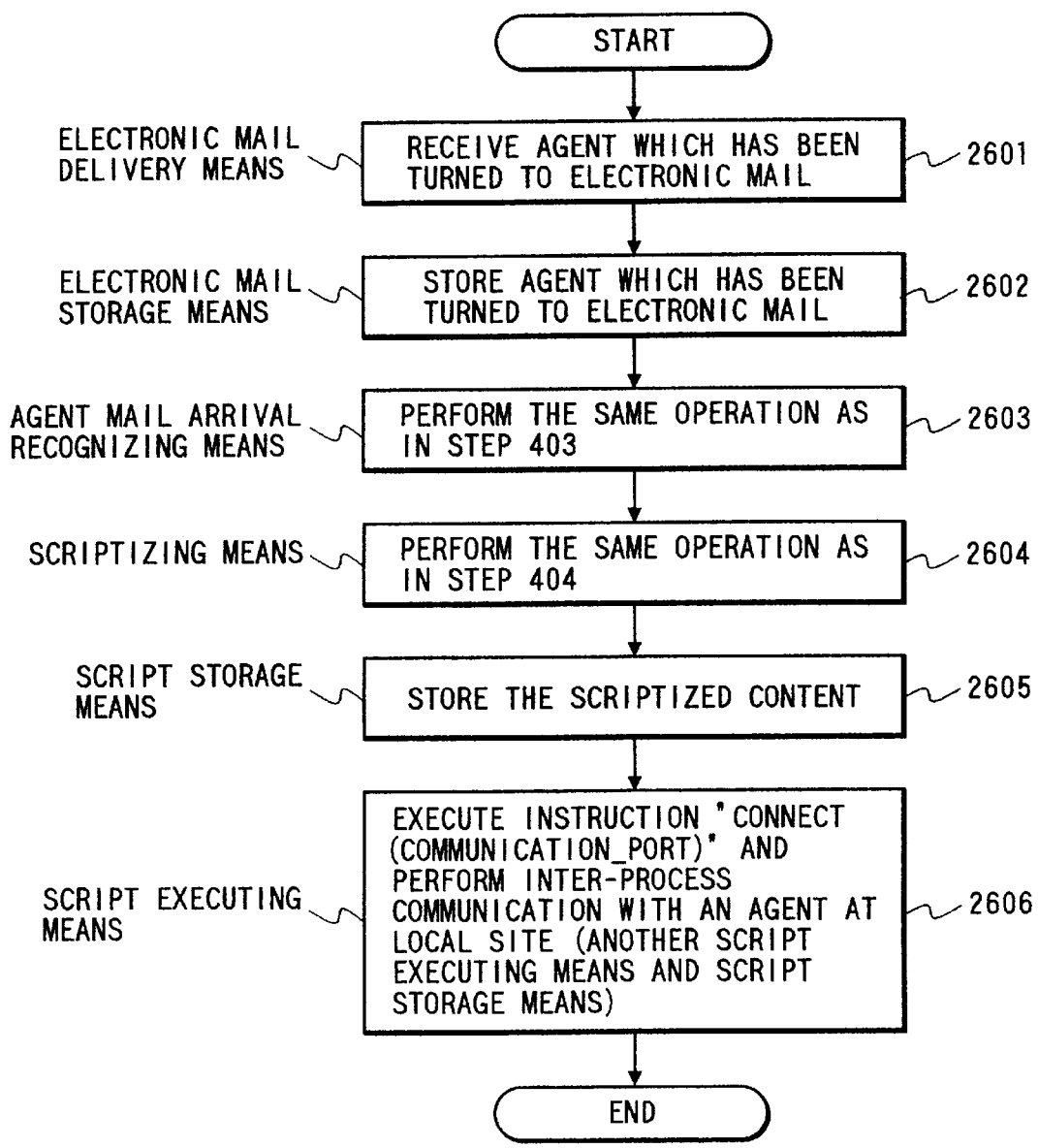

FIG. 27

```
From:     tsuyoshi@trl.mei.co.jp
Subject:  Agent
Date:     Mon, 08 Jan 1996 18:00:00 JST
To:       ueno@trl.mei.co.jp agentscript>
     id> 10001 <id
     image>
               image1: encoded image data 1
               image2: encoded image data 2
     <image
     knowledge>
               address: yamamoto@trl.mei.co.jp,
                        hideki@trl.mei.co.jp,
                        tsuyoshi@trl.mei.co.jp
           ○ communication_port: 3000

<knowledge
     rule>
               display("How is it convenient on January 10 ?")
               input(text)
               text="go_next"  -> get_next(address),go
               text="yes"      -> display(image1),write(yes)
               text="no"       -> display(image2),write(no)
               text="$name: not present" ->delete(address,$name)
               text="talk"     -> connect(hostname,port),send(text)
           ○ time=10          -> connect(communication_port),
                                  ask("1/10: OK ?")
                                  write(answer)
                     text=?    -> add(rule,"?->hear(?)")
     <rule
<agentscript
```

FIG. 30

```
From:    tsuyoshi@trl.mei.co.jp
Subject: Agent
Date:    Mon, 08 Jan 1996 18:00:00 JST
To:      ueno@trl.mei.co.jp agentscript>
      id> 10001 <id
      image>
               image1: encoded image data 1
               image2: encoded image data 2
      <image
      knowledge>
               address: yamamoto@trl.mei.co.jp,
                        hideki@trl.mei.co.jp,
                        tsuyoshi@trl.mei.co.jp
          ○ communication_port: 3000

<knowledge
      rule>
               display("How is it convenient on January 10 ?")
               input(text)
               text="go_next"  -> get_next(address),go
               text="yes"      -> display(image1),write(yes)
               text="no"       -> display(image2),write(no)
               text="$name: not present" ->delete(address,$name)
               text="talk"     -> connect(hostname,port),send(text)
          ○ time=10   -> write(communication_place,"1/10: OK ?")
                                read(communication_place,answer),
                                write(answer)
                   text=?    -> add(rule,"?->hear(?)")
      <rule
<agentscript
```

Name of describer:

Address of transmitting destination: 1, 2, 3 ···· title name:

Data (document, image, sound)

Server address:

Behavioral description:

Data (document, image, sound)

Address of transmitting destination

Behavioral description

Data (document, image, sound)

AGENT COMMUNICATION SYSTEM WITH DYNAMIC CHANGE OF DECLARATORY SCRIPT DESTINATION AND BEHAVIOR

BACKGROUND OF THE INVENTION

1. Field of the Invention

The present invention relates to an agent communication system for moving an agent, which acts for a request of a user and for performing communication between agents in relation to a program including a knowledge base or a rule base to be transmitted or received using means such as electronic mail.

2. Description of the Related Art

At present, an electronic mail system as shown in FIG. 34 and FIG. 35 is used to give and receive information using a network. The electronic mail system can now handle data of multi-media, but it simply shows the received multi-media data to the user, and the user cannot perform interaction with them.

JP-A-4-236542 discloses a system, in which buttons and the like are shown to the user to allow interaction. But, it is simply operated according to a procedure determined before transmission, and it cannot cope with the case of an input not expectable prior to transmission or the case where the condition at the destination of transmission has dynamically changed. Also, in the system shown in FIG. 36 and FIG. 37, an address of a server with information available is transmitted by input of the user, and a script (program) is executed by download so that the user can perform interaction. The system such as Hotjava of Sun Microsystems Inc. can also simply execute a predetermined procedure.

In contrast, there is a system disclosed by JP-A-7-182174, by which the script can be uploaded (transmitted on the network) as shown in FIG. 38 and FIG. 39, and the program can be executed at the destination of the transmission. But, this is also to simply execute a procedure determined prior to transmission at the destination of the transmission.

However, in the conventional system as described above, multi-media data or script (program) can be transmitted or received, and it is interactive with the user. But, the transmitted or the received script behaves according to a procedure determined in advance, and it cannot cope with the situation which has not been expected or which changes dynamically. A special environment is required for moving the agent, and the agent cannot move where there is no such environment.

SUMMARY OF THE INVENTION

To solve the above problems, it is an object of the present invention to provide a system, by which it is possible to cope with dynamic change at a destination of a script (program) and to allow the agent to intelligently behave. Also, it is another object of the invention to provide a system, by which it is possible to achieve an environment for moving the agent by utilizing the existing environment as much as possible.

The script as mentioned in the present invention means a description such as macro obtained by further abstraction of a program. More concretely, it means multi-media data, knowledge description or behavioral description, which is used by an agent described in an electronic mail.

To attain the above objects, in the agent communication system according to the present invention, special environment for moving an agent is reduced as far as possible by utilizing the existing electronic mail system, knowledge description (knowledge base) or behavioral description (rule base) to intelligently operate are maintained in the internal description of electronic mail or transfer data, and the agent is moved in the form of the electronic mail or the transfer data, and a description including agent data (knowledge description and behavioral description) is recognized at the destination of moving and is converted to a program and the like, and the agent is started so that it functions by utilizing the knowledge base and the rule base, and further the agent is moved by turning it to a transfer data or an electronic mail.

As a result, an agent communication system can be provided, by which it is possible to reduce special environment for the agent as much as possible and to make the agent function intelligently and flexibly at the destination of moving of the agent.

According to the invention as set forth in one embodiment of the present application, an agent, which is a program moving by utilizing transmitting and receiving means, maintains a knowledge base and a rule base, which are descriptions of knowledge and behavior of a multi-media data or an agent, recognizes from content of the description that the arrived data are the data including the agent, converts the data to a code for an executable program or for interpreter to automatically fulfill the function of the agent, fulfills intelligent function using the knowledge base and the rule base by starting the agent and turns to the data by input from the user moving to the other place or by judgment of the agent itself, thereby the agent (a set of script executing means and a script in script storage means) can update or select its own knowledge base or the rule base and can efficiently cope with dynamic situations at the destination and to intelligently operate.

According to another feature of the invention of the present application, there is provided an agent communication system, which comprises electronic mail delivery means for delivering an electronic mail, electronic mail storage means for storing the delivered electronic mail, agent mail arrival recognizing means for recognizing a description of an agent data from the electronic mail arrived at the electronic mail storage means, scriptizing means for extracting an agent data from the electronic mail in the electronic mail storage means at a notification from the agent mail arrival recognizing means and for converting it to a script, script storage means for storing the script, script executing means for executing the script stored in the script storage means, output means for outputting from the script executing means, and electronic mail preparing means for preparing an electronic mail from the data coming from the script storage means or the electronic mail storage means at a notification from the script executing means and for sending the prepared electronic mail to the electronic mail delivery means, and the same operation as set forth in claim 1 can be achieved.

According to yet another feature of the invention of the present application, there is provided an agent communication system, in which an agent, which is a moving program, uses its knowledge base and rule base to an information source at the destination of moving and collects information, whereby the agent can intelligently collect the information requested by a user using the knowledge base and the rule base.

According to still another feature of the invention of the present application, there is provided an agent communication system, which comprises information storage means for storing information, and script executing means having a function to input and output information to and from the information storage means, in addition to the electronic mail delivery means, the script storage means, the electronic mail storage means, the agent mail arrival recognizing means, the scriptizing means, and the electronic mail preparing means as set forth in claim 2, and the same operation as in claim 3 can be achieved.

According to another feature of the invention of the present application, there is provided an agent communication system, in which an agent, which is a moving program, has a function to communicate with other agents or servers, and after the agent has moved, it is possible to communicate synchronously or non-synchronously with another agent on a network or an agent at the destination of moving or an agent moved subsequently.

According to yet another feature of the invention of the present application, there is provided an agent communication system, which comprises script executing means for communicating with other servers or script executing means, in addition to the electronic mail delivery means, the script storage means, the electronic mail storage means, the agent mail arrival recognizing means and the scriptizing means as set forth in claim 2, and the same operation as in claim 5 can be achieved.

According to still another feature of the invention of the present application, there is provided an agent communication system, in which an agent, which is a moving program, contains a plurality of agent data in its electronic mail or its transfer data, and being divided and started after moving, the agent can fulfill the function of the agent, whereby, in placing a plurality of agents or applications on the electronic mail or the transfer data, it is possible to perform parallel processing of request of a user or to provide a presentation using a plurality of agents or applications to the user at one time.

According to another feature of the invention of the present application, there is provided an agent communication system, which comprises electronic mail dividing means for dividing the electronic mail including a plurality of agent data stored in the electronic mail storage means and for delivering the electronic mail to the scriptizing means, in addition to the electronic mail delivery means, the script storage means, the script executing means, output means, electronic storage means, agent mail arrival recognizing means, and the scriptizing means as set forth in claim 2, and the same operation as in claim 7 can be achieved.

According to yet another feature of the invention of the present application, there is provided an agent communication system, in which an agent, which is a moving program, can automatically expand functions by the extent of the agent data in the electronic mail or the transfer data transmitted subsequently by a user, another agent, a server or the agent itself after moving, whereby the agent can procure a knowledge base or a rule base as necessary, and it is possible to efficiently cope with dynamic situations at the destination of moving or to operate intelligently.

According to still another feature of the invention of the present application, there is provided an agent communication system, which comprises script expanding means for expanding the script stored subsequently in the script storage means to a script stored in the script storage means, in addition to the electronic mail delivery means, the script storage means, the script executing means, the output means, the electronic mail storage means, the agent mail arrival recognizing means, and the scriptizing means as set forth in claim 2, and the same operation as in claim 9 can be achieved.

According to another feature of the invention of the present application, there is provided an agent communication system, in which an agent, which is a moving program, has function to operate in accordance with environment such as resource of user level after moving, and it is possible to provide an interface to the user to comply with environment at the destination of moving of the agent or to provide a user interface complying with the user level.

According to yet another feature of the invention of the present application, there is provided an agent communication system, which comprises user input means for inputting a user to the script executing means and user input means changing means for providing a user interface necessary for execution of the script executing means to the user input means, in addition to the electronic mail delivery means, the script storage means, the script executing means, the electronic mail storage means, the agent mail arrival recognizing means, the scriptizing means and the output means as set forth in claim 2, and the same operation as in claim 11 can be achieved.

According to still another feature of the invention of the present application, there is provided an agent communication system, in which an agent, which is a moving program, has function to guide the agent by changing, adding or specifying the destination of moving at the destination of moving, and it is possible to guide the agent along a predetermined route by obtaining a movable destination which can be moved at the destination of the moving.

According to another feature of the invention of the present application, there is provided an agent communication system, which comprises destination input means for inputting destination information to the script executing means, in addition to the electronic mail delivery means, the script storage means, the electronic mail storage means, the agent mail arrival recognizing means, the scriptizing means, the electronic mail preparing means, the script executing means, and the output means as set forth in claim 2, and the same operation as in claim 13 can be achieved.

According to yet another feature of the invention of the present application, there is provided an agent communication system, in which, in case the function currently usable by the knowledge base and the rule base is not sufficient, an agent, which is a moving program, finds out a part necessary from data base of a large amount of the knowledge base and the rule base to supplement the knowledge base or the rule base, whereby the agent can select its own knowledge base or the rule base as necessary, and it is possible to efficiently cope with dynamic situations at the destination and to intelligently operate.

According to still another feature of the invention of the present application, there is provided an agent communication system, which comprises the user input means as set forth in claim 14, general-purpose script storage means for storing a general-purpose script, and script executing means having function to find necessary script from the general-purpose script storage means and to add or replace in the script storage means, in addition to the electronic mail delivery means, the script storage means, the electronic mail storage means, the agent mail arrival recognizing means, the scriptizing means, the electronic mail preparing means, and the output means as set forth in claim 2, and the same operation as in claim 15 can be achieved.

According to yet another feature of the invention of the present application, there is provided an agent communication system, which comprises electronic mail information storage means for storing information of the electronic mail arrived at the electronic mail delivery means and electronic mail information recognizing means for checking information in the electronic mail information storage means, in addition to the electronic mail delivery means, the electronic mail preparing means, the script storage means, and the script executing means as set forth in claim 2, whereby the user does not search necessary information but simply transmits its request to a predetermined destination by electronic mail, and it is possible not only to receive the searched information but also to receive an agent, which can interactively explain the information.

BRIEF DESCRIPTION OF THE DRAWINGS

The object and features of the present invention will become more readily apparent from the following detailed description of the preferred embodiments taken in conjunction with the accompanying drawings in which:

FIGS. 3(a) and 3(b) represent examples of an agent, which has been turned to a received electronic mail in the first embodiment of the invention;

FIG. 5 represents data stored in script storage means in the first embodiment;

FIG. 6 shows an example of an electronic mail prepared by electronic mail preparing means in the first embodiment;

FIG. 8 is a flow chart showing a procedure of agent communication in the second embodiment;

FIG. 9 represents an example of an agent, which has been turned to a received electronic mail in the second embodiment;

FIG. 11 is a flow chart showing a procedure of agent communication in the third embodiment;

FIG. 12 shows an example of an agent, which has been turned to the electronic mail received in the third embodiment;

FIG. 15 represents an example of an agent, which has been turned to a received electronic mail in the fourth embodiment;

FIG. 17 is a flow chart showing a procedure of agent communication in the fifth embodiment;

FIG. 18 represents an example of a received electronic mail in the fifth embodiment;

FIG. 19 shows data stored in script storage means in the fifth embodiment;

FIG. 26 is a flow chart showing a procedure of agent communication in the eighth embodiment;

FIG. 27 represents an example of a received electronic mail in the eighth embodiment;

FIG. 30 represents an example of a received electronic mail in the ninth embodiment;

DETAILED DESCRIPTION OF THE PREFERRED EMBODIMENTS

In the following, description will be given of embodiments of the present invention referring to FIG. 1 to FIG. 33.

1st Embodiment

Figures 1, 2:
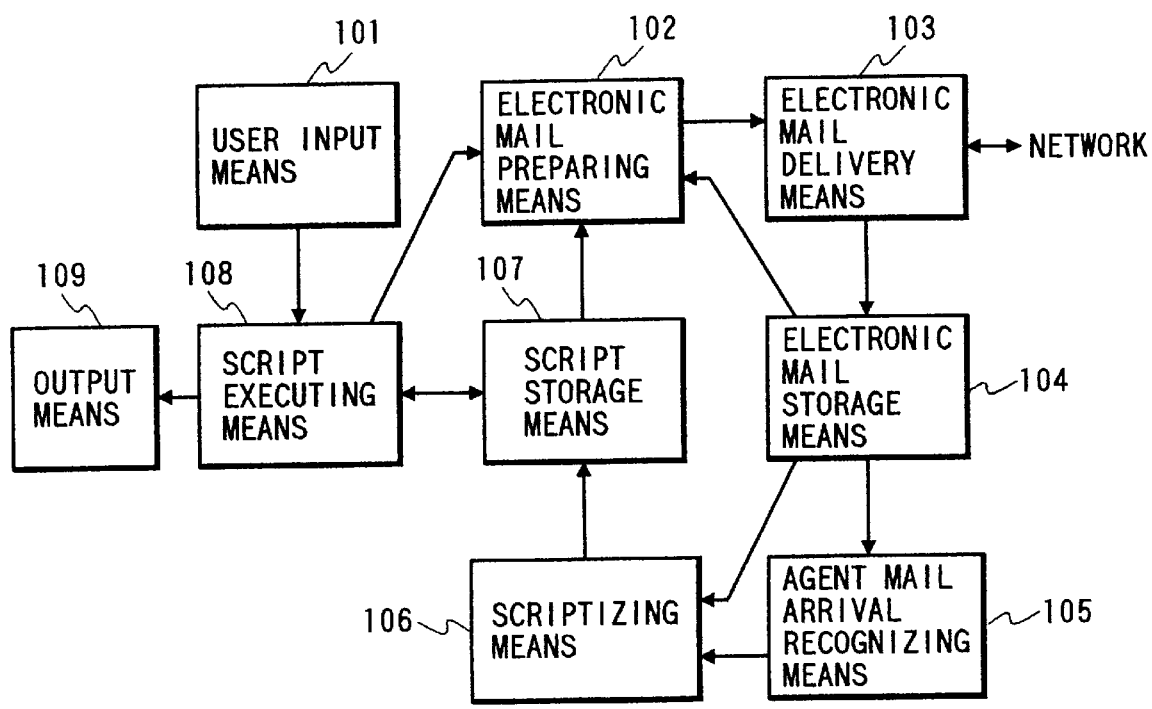
FIG. 1 is a block diagram showing an arrangement of an agent communication system of a first embodiment of the present invention.
FIG. 2 shows descriptions of an electronic mail in the agent communication system of the present invention.

First, a first embodiment of the present invention will be described referring to FIG. 1. FIG. 1 is a conceptual drawing to show an arrangement of an agent communication system in the first embodiment of the present invention. In FIG. 1, reference numeral 103 represents electronic mail delivery means for delivering an electronic mail, 104 represents electronic mail storage means for storing the delivered electronic mail, 105 represents agent mail arrival recognizing means for recognizing a description of an agent data from the electronic mail arrived at the electronic mail storage means, 106 represents scriptizing means for extracting the agent data from the electronic mail in the electronic mail storage means 104 at a notification of the agent mail arrival recognizing means 105 and for converting it to a script, 107 represents script storage means for storing the script, 108 represents script executing means for executing the script stored in the script storage means 107, 101 represents user input means for inputting the user to the script executing means 108, 109 represents output means for performing output from the script executing means 108, and 102 represents electronic mail preparing means for preparing an electronic mail from the data of the script storage means 107 and the electronic mail storage means 104 at a notification from the script executing means 108 and for sending the prepared electronic mail to the electronic mail delivery means 103.

Figures 35, 36, 37:
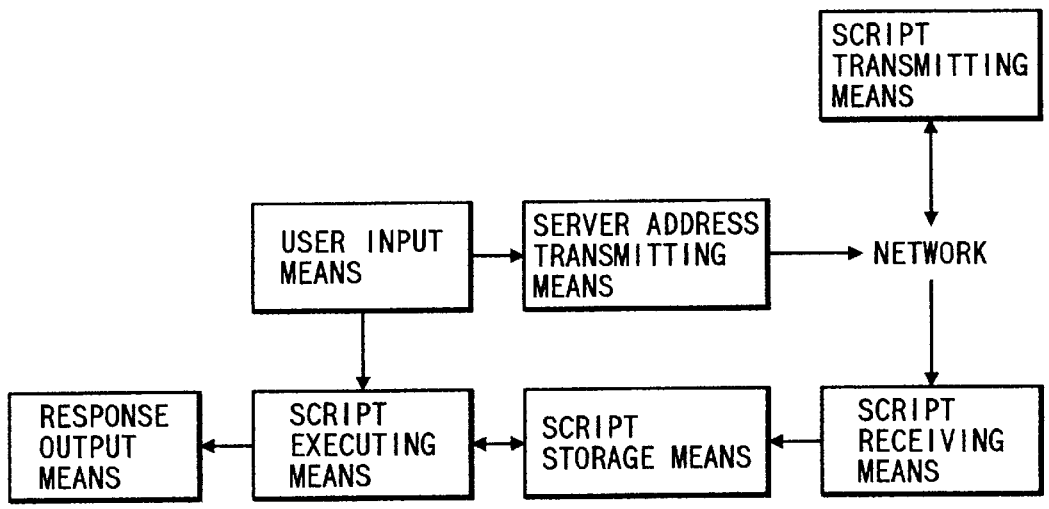
FIG. 35 shows a description of a conventional type electronic mail.
FIG. 36 is a first block diagram showing an arrangement of a conventional type agent communication system.
FIG. 37 shows a description of a script in the arrangement of FIG. 36.

In the following, description will be given on operation of an agent communication system with the above arrangement. FIG. 2 shows a description in an electronic mail to be used in the agent communication system. It differs from the conventional type electronic mail (FIG. 35) in that it includes a behavioral description and a knowledge description.

Figure 4:
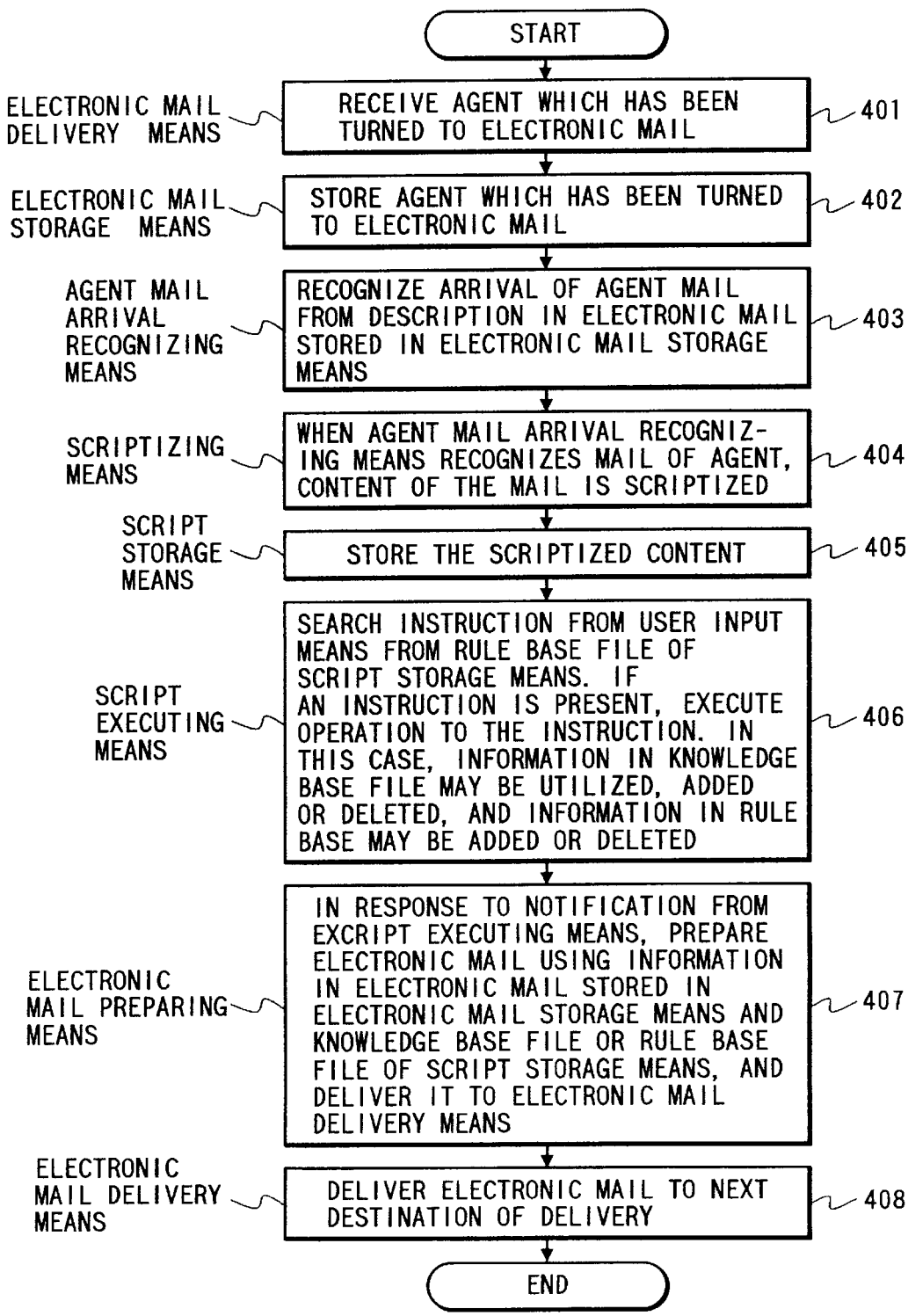
FIG. 4 is a flow chart showing a procedure of agent communication in the first embodiment.
Figures 38, 39:
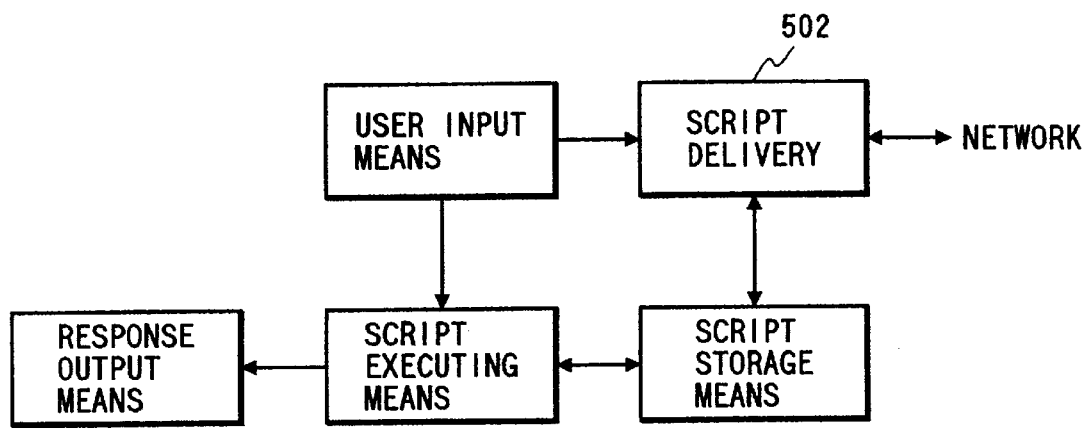
FIG. 38 is a second block diagram showing an arrangement of a conventional type agent communication system.
FIG. 39 shows a description of a script in the arrangement of FIG. 38.

Also, it differs from other conventional systems (FIG. 37 and FIG. 39) in that it includes a knowledge description and that the knowledge description and the behavioral description can be dynamically changed. FIGS. 3(a) and 3(b) show concrete examples of description of an electronic mail, which is "an agent asking conveniences" as described in accordance with FIG. 2. FIG. 3(a) shows main portion of the electronic mail, and FIG. 3(b) shows the meaning of its notation. FIG. 4 is a flow chart to show an operating procedure of the present system in case the electronic mail of FIG. 3 is received. In the following, description will be given on operation when the electronic mail of FIG. 3(a) is received in accordance with FIG. 4.

In FIG. 4, the electronic mail delivery means 103 receives an agent (containing a description to the agent in the description of the electronic mail), which has been turned to an electronic mail (Step 401). Then, the electronic mail storage means 104 stores the electronic mail shown in FIG. 3(a) (Step 402).

If it is described as "Agent" in the title of the portion "Subject: title name", for example, in the description of the electronic mail stored in the electronic mail storage means 104, the agent mail arrival recognizing means 105 recognizes that the agent mail has arrived (Step 403). When the agent mail arrival recognizing means 105 recognizes the mail of the agent, the scriptizing means 106 extracts from id> to <rule in the mail. Image data included from image> to <image in the script storage means 107 are decoded and are turned to an image file, and data from knowledge> to <knowledge or data from rule> to <rule are stored as a knowledge base file or a rule base file (1) (Step 404).

In Step 404, it is possible to convert to a program such as C language, which can execute the content of description of this script, and to compile and to turn it to an executable file (2). Also, it is possible to store it as combination of (1) and (2) or as a program of prolog. Here, explanation will be given below on the case of (1).

An image file 1, an image file 2, a knowledge base file, and a rule base file as shown in FIG. 5 are stored in the script storage means 107 (Step 405).

The script executing means 108 searches an instruction from the user input means 101 from the rule base file of the script storage means 107. If there is an instruction, an operation to the instruction is executed. In this case, information of the knowledge base file may be utilized, added or deleted, or information of the rule base may be added or deleted.

For example, an instruction "display" in the rule base file is executed, and it is displayed: "How is it convenient on January 10?", asking the convenience for the user. Then, an instruction "input (text)" is executed, and an interface to input characters for the user is displayed.

For example, in case the user knows that there is no person named "hideki", it is inputted from the user input means 101 that "hideki: not present". Because there is no matching description in the rule base, it matches "?" in this case. By an instruction "hear" of argument of the instruction "add", it is asked to the user that "hideki: not present?", asking what should be done to the user. Here, if "delete", "destination address", "hideki", etc. are inputted from the user input means in menu, it is converted to an instruction to the agent such as "delete (address, "hideki")". In case an input from the user as "hideki: not present" is received to the rule base, the message "text="hideki: not present"->delete (address, "hideki")" is added as a behavioral description to delete destination address of hideki from the destination in the knowledge base file.

In some cases, this is generalized, and the part "hideki" is replaced with a variable $name, and the message "text= "$name: not present"->delete (address, $name)" is added. In this case, the generalized message is added and this is executed, and the statement "hideki@trl.mei.co.jp, in the knowledge base file is deleted ($name is a variable). In this way, it is possible to dynamically change the behavior and to cope with it.

When an instruction "yes" is inputted, the behavior "display (image 1)" is executed from the description of "yes" in the rule base file, and the image of "image 1" is displayed. For example, an image pleasing to the agent is displayed to the user, and it is written in the knowledge base file as "yes:ueno", for example.

Here, if the user inputs "get next", the statement "yamamoto@trl.mei.co.jp" is extracted from "get next (address) and from the portion of "address:" in the knowledge base, and it is delivered to the electronic mail preparing means 702 (Step 406).

In response to a notification from the script executing means 107, the electronic mail preparing means 102 prepares an electronic mail by utilizing the electronic mail stored in the electronic mail storage means 104 or the information such as the knowledge base file or the rule base file of the script storage means 107, and delivers it to the electronic mail delivery means 103.

For example, it is supposed here that an electronic mail as shown in FIG. 6 is prepared. In FIG. 6, the portion marked with ○ is the changed portion. The electronic mail delivery means 103 delivers the electronic mail to the next delivery destination. By repeating this procedure, number of persons, for whom it is convenient on January 10, can be obtained by counting number of the words "yes", which are found from knowledge> to <knowledge.

The user input means 101 and the output means 109 are present from the beginning in some cases, while these are generated by the script executing means 108 in some other cases. Also, the script executing means 108 may also be generated by the scriptizing means 106. The same applies to the subsequent embodiments.

In the present embodiment, the knowledge description or the behavioral description of the agent has been changed by input from the user while the knowledge description or the behavioral description may be changed by the agent itself in response to the resource at the destination of moving.

As described above, in the present embodiment, there is a description to change data of agent, knowledge description or behavioral description in the behavioral description of the agent, and this can be executed. Accordingly, it is possible to efficiently cope with dynamic situations at the destination of moving.

2nd Embodiment

Figure 7:
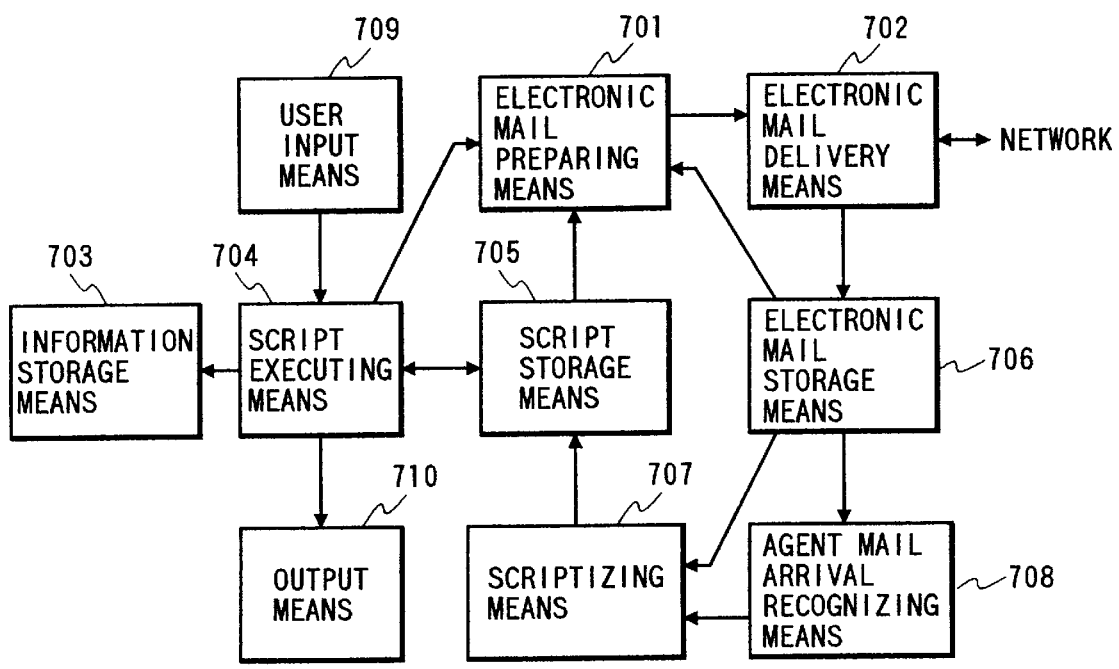
FIG. 7 is a block diagram showing an arrangement of an agent communication system in a second embodiment of the present invention.

Next, description will be given on a second embodiment of the present invention referring to FIG. 7. FIG. 7 is a conceptual drawing of an arrangement of an agent communication system of the present embodiment. In FIG. 7, reference numeral 702 represents electronic mail delivery means for delivering an electronic mail, 706 represents electronic mail storage means for storing the delivered electronic mail, 708 represents agent mail arrival recognizing means for recognizing description of an agent data in the electronic mail arrived at the electronic mail storage means 706, 707 represents scriptizing means for extracting the agent data from the electronic mail in the electronic mail storage means 706 at a notification from the agent mail arrival recognizing means 708 and for converting it to a script, 705 represents script storage means for storing the script, and 703 represents information storage means for storing the information. Reference numeral 704 represents script executing means for executing the script stored in the script storage means and for inputting or outputting the information to the information storage means 703, 709 represents user input means for inputting the user to the script executing means 704, 710 represents output means for performing output of the script executing means 704, and 701 represents electronic mail preparing means for preparing an electronic mail from the data of the script storage means 705 or the electronic mail storage means 706 at a notification from the script executing means 704 and for sending the prepared electronic mail to the electronic mail delivery means 702.

In the following, description will be given on the agent communication system with the above arrangement. FIG. 8 shows an operating procedure of the agent communication system. Description will be given below on an example of a system for asking conveniences and its operation referring to FIG. 8.

First, the electronic mail delivery means 702 receives an agent, which has been turned to an electronic mail (Step 801). Then, the electronic mail storage means 706 stores the agent, which has been turned to the electronic mail (Step 802). It is supposed that the stored description is a description as shown in FIG. 9, for example. In FIG. 9, the portion marked with ○ is a characteristic portion. The agent mail arrival recognizing means 708, the scriptizing means 707 and the script storage means 705 perform the same operation as in the first embodiment (Steps 803 to 805).

The script executing means 704 performs the same operation as in Step 406. In case there is an instruction to obtain information in the rule base, the desired information is obtained from the information storage means 703.

For example, in case there is no response from the user within 10 minutes after arrival of the agent script, "time=10" in the rule base matches, and an instruction "get information from" is executed. From the directory "/tmp/schedule", which is the specified place in the information storage means 703, a schedule information is obtained. The information is then written to the knowledge base file and is notified to the electronic mail preparing means 701, and it is moved to the next destination.

In this method, if the user is not present, adjustment can be made by bringing the schedule information back. This is also applicable for collection of the desired information (Step 1106).

As described above, according to the present embodiment, the instruction to obtain information can be executed by the script executing means, and the agent data can be transferred by moving means such as electronic mail system. Thus, the agent can collect the information requested by the user by utilizing the knowledge base and the rule base. In particular, it is possible to collect not only global information as registered in the data base but also local information, which cannot be obtained publicly.

It is also possible that it becomes a part of description of the information source and it can be started by gaining access to it.

3rd Embodiment

Figure 10:
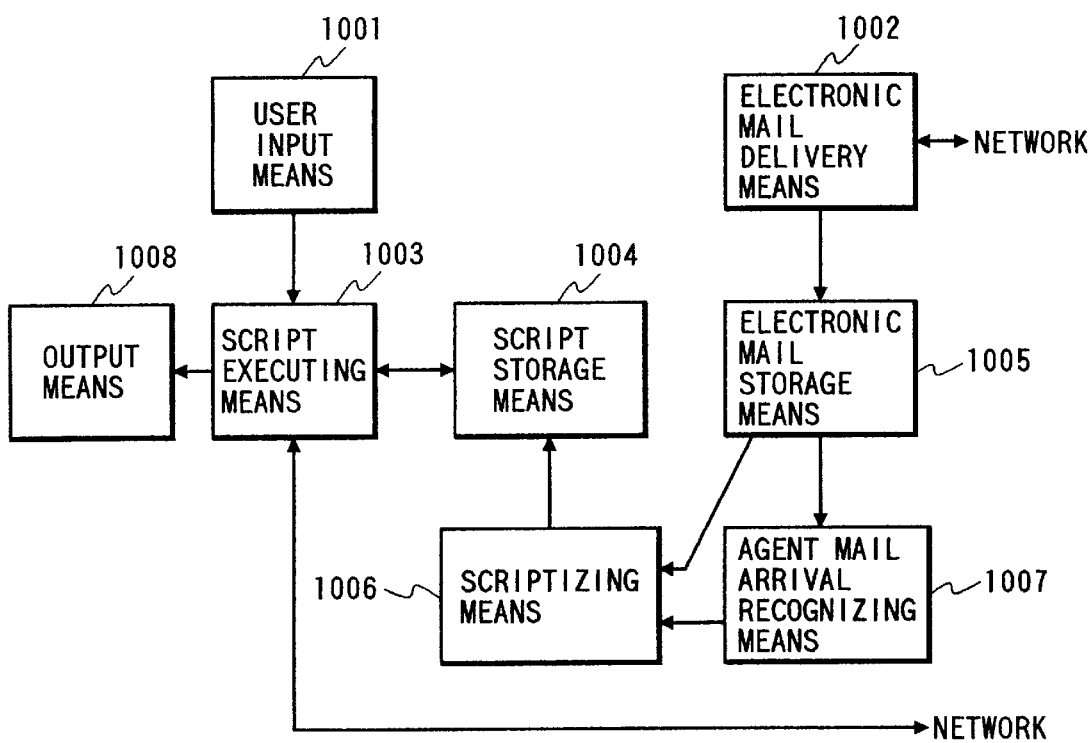
FIG. 10 is a block diagram showing an arrangement of an agent communication system in a third embodiment of the invention.

Description will be given now on a third embodiment of the invention referring to FIG. 10. FIG. 10 is a conceptual drawing of an arrangement of an agent communication system of the present embodiment. In FIG. 10, reference numeral 1002 represents electronic mail delivery means for delivering an electronic mail, 1005 represents electronic mail storage means for storing the delivered electronic mail, 1007 represents agent mail arrival recognizing means for recognizing description of an agent data from the electronic mail arrived at the electronic mail storage means 1005, 1006 represents scriptizing means for extracting the agent data from the electronic mail in the electronic mail storage means 1005 at a notification from the agent mail arrival recognizing means 1007 and for converting it to a script, 1004 represents script storage means for storing the script, 1003 represents script executing means for executing the script stored in the script storage means 1004 or for performing communication with other script executing means or servers, 1001 represents user input means for inputting the user to the script executing means 1103, and 1008 represents output means for performing output of the script executing means 1003.

For the agent communication system with the above arrangement, description will be given now on its operation. FIG. 11 shows an operating procedure of the agent communication system. In the following, description will be given on a system for asking conveniences and its operation referring to FIG. 11.

First, the electronic mail delivery means 1002 receives an agent, which has been turned to an electronic mail (Step 1101). Then, the electronic mail storage means 1005 stores the agent, which has been turned to the electronic mail (Step 1102). It is supposed here that the stored description is a description as shown in FIG. 12. In FIG. 12, the portion different from the above is the portion marked with ○. The agent mail arrival recognizing means 1007, the scriptizing means 1006, and the script storage means 1004 perform the same operation as in the first embodiment (Steps 1103 to 1105). The script executing means 1003 searches an instruction from the user input means 1001 from the rule base file of the script storage means 1004. If an instruction is present, the operation to the instruction is executed.

In this case, the information of the knowledge base file may be utilized, added or deleted, or the information of the rule base may be added or deleted. If there is an instruction to communicate with other process, the instruction is executed.

For example, an instruction "display" in the rule base file is executed, and a message "How is it convenient on January 10?" is displayed, asking the convenience of the user. Then, an instruction "input (text)" is executed, and an interface to input characters for the user is displayed. When an instruction "talk" is executed, behaviors "connect" and "send" are executed from the description "talk" in the rule base. The statement "connect" is an instruction to make connection with an agent or a server from the argument "host name" and "port" and to perform inter-process communication. By an instruction "send", a character string inputted by the user is sent.

Here, description has been given on a case where a moved agent communicates with an agent or a server at a site prior to the moving (machine name: oliver), while communication may be performed between the agents before moving by sharing machine name and port number. As described above, in the present embodiment, an instruction can be executed, by which the script executing means can communicate. Thus, the agent can synchronously communicate with other agent on the network or with other user or the server after moving by utilizing the electronic mail, and new information can be obtained at real time.

4th Embodiment

Figure 13:
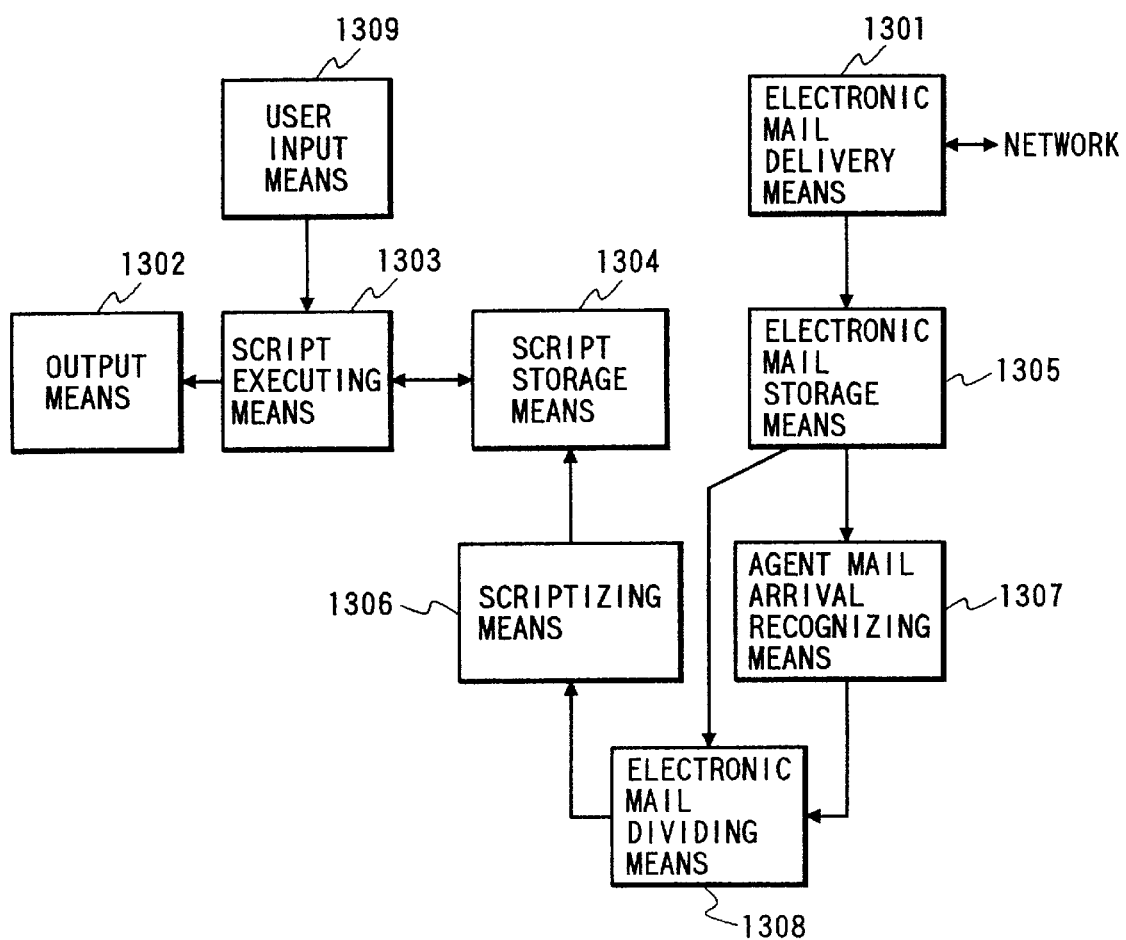
FIG. 13 is a block diagram showing an arrangement of an agent communication system in a fourth embodiment of the invention.

Description will be given now on a fourth embodiment of the invention referring to FIG. 13. FIG. 13 is a conceptual drawing of an arrangement of an agent communication system in the present embodiment. In FIG. 13, 1301 represents electronic mail delivery means for delivering an electronic mail, 1305 represents electronic mail storage means for storing the delivered electronic mail, 1307 represents agent mail arrival recognizing means for recognizing description of an agent data from the electronic mail arrived at the electronic mail storage means 1305, 1308 represents electronic mail dividing means for dividing data in case the electronic mail in the electronic mail storage means 1305 contains a plurality of agent data at a notification from the agent mail arrival recognizing means 1307, 1306 represents scriptizing means for converting the divided agent data to a script, 1304 represents script storage means for storing the script, 1303 represents script executing means for executing the script stored in the script storage means 1304, 1302 represents output means for performing output of the script executing means 1303, and 1309 represents user input means for inputting the user to the script executing means 1303.

Figure 14:
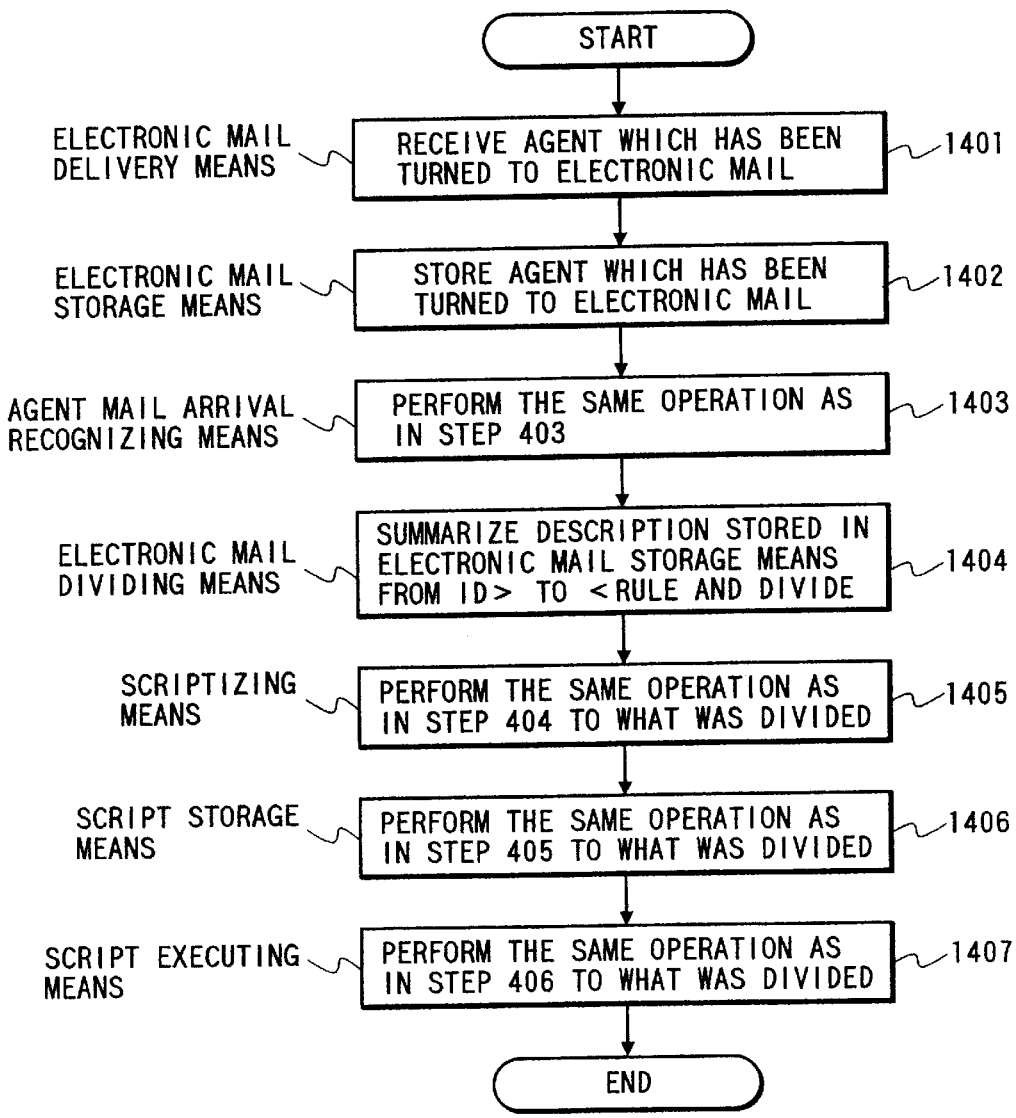
FIG. 14 is a flow chart showing a procedure of agent communication in the fourth embodiment.

For the agent communication system with the above arrangement, description will be given below on its operation. FIG. 14 shows an operating procedure of the agent communication system. Description will be given below on a system for asking conveniences and its operation referring to FIG. 14.

First, the electronic mail delivery means 1301 receives an agent, which has been turned to an electronic mail (Step 1401). Then, the electronic mail storage means 1305 stores the agent which has been turned to the electronic mail (Step 1402). Here, it is supposed that the stored description is a description as shown in FIG. 15. The portion different from the above is the portion marked with ○. The agent mail arrival recognizing means 1307 performs the same operation as described above (Step 1403). The electronic mail dividing means 1308 summarizes the descriptions stored in the electronic mail storage means 1305 from id> to <rule, and divides it (Step 1404). The scriptizing means 1306, the script storage means 1304, and the script executing means 1304 perform the same operation to what has been divided (Steps 1405 to 1407).

For example, two rule base files are executed in parallel. In the execution of the first rule base, the agent for asking convenience on January 10 works. In the execution of the second rule base, the agent for asking convenience for tennis playing works. The advantage of sending the two agents together and dividing is that the first convenience and the second convenience overlap each other and exert influence on each other.

Further, the first agent still has the work to ask conveniences of the other persons, and the matters can be entrusted to the second agent, and more efficient operation can be achieved. Also, there is a method to divide according to the resources after moving.

As described above, according to the present embodiment, a plurality of agents and applications can be placed on the electronic mail and these can be divided and executed after transferring them. Accordingly, it is possible to perform parallel processing of the request of the user or to provide presentation at one time using a plurality of agents and applications to the user.

5th Embodiment

Figure 16:
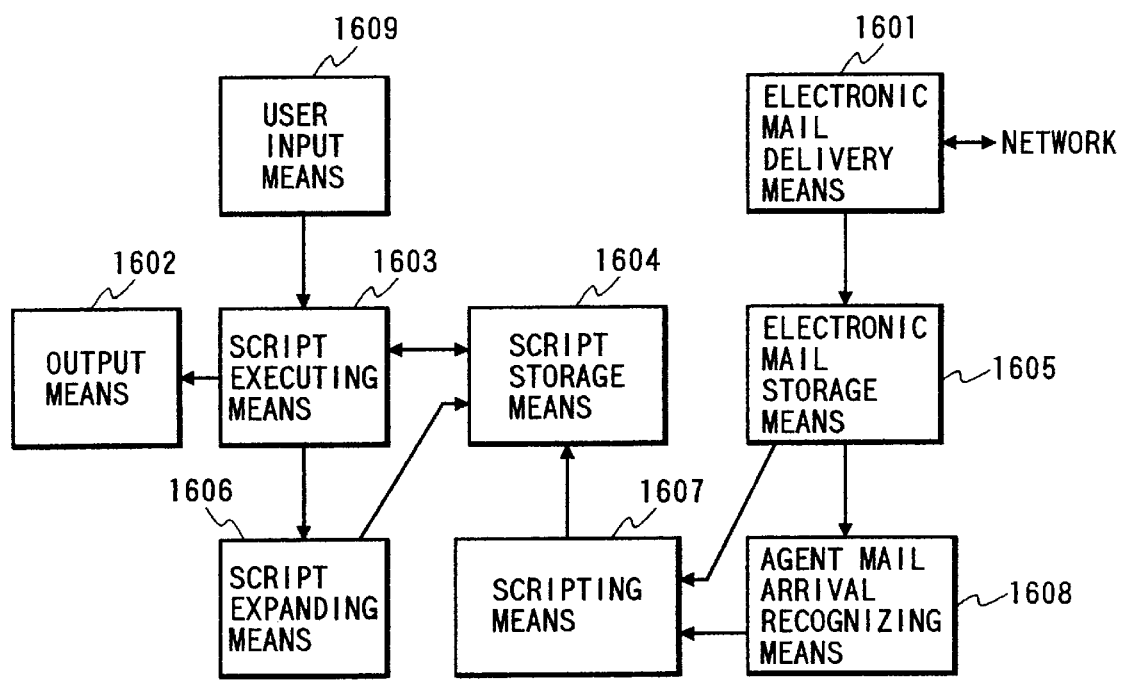
FIG. 16 is a block diagram showing an arrangement of an agent communication system in a fifth embodiment of the invention.

Description will be given now on a fifth embodiment of the invention referring to FIG. 16. FIG. 16 is a conceptual drawing of an arrangement of an agent communication system of the present embodiment. In FIG. 16, 1601 represents electronic mail delivery means for delivering an electronic mail, 1605 represents electronic mail storage means for storing the delivered electronic mail, 1608 represents agent mail arrival recognizing means for recognizing description of agent data from the electronic mail arrived at the electronic mail storage means 1605, 1607 represents scriptizing means for extracting the agent data from the electronic mail in the electronic mail storage means 1605 at a notification from the agent mail arrival recognizing means 1608 and for converting it to a script, 1604 represents script storage means for storing the script, 1606 represents script expanding means for adding the agent data arrived subsequently to the agent data arrived already and for expanding it, 1603 represents script executing means for executing the script stored in the script storage means 1604, 1609 represents user input means for inputting the user to the script executing means 1603, and 1602 represents output means for performing output of the script executing means 1403.

For the agent communication system with the above arrangement, description will be given on its operation. FIG. 17 shows an operating procedure of the agent communication system. Description will be given below on a system for asking conveniences and its operation referring to FIG. 17.

First, the electronic mail delivery means 1601 receives an agent, which has been turned to an electronic mail (Step 1701). The electronic mail storage means 1605 stores the agent, which has been turned to the electronic mail. Here, it is supposed that the stored description is a description in FIG. 3(a) as shown in Step 402 (Step 1702).

The agent mail arrival recognizing means 1608, the scriptizing means 1607, and the script storage means 1604 perform the same operation as described above (Steps 1703 to 1705). The script executing means 1603 performs the same operation as in Step 406 (Step 1706).

The electronic mail delivery means 1601 receives the next agent mail (Step 1707). Here, it is supposed that the electronic mail stored in the electronic mail storage means 1605 is a description shown in FIG. 18. If there is a description "Agent-Add-Data" in the title on the portion "Subject:title name", for example, in the description of the electronic mail stored in the electronic mail storage means 1605, the agent mail arrival recognizing means 1608 recognizes that additional data of the agent has arrived. Then, notification will be given to the script expanding means 1606.

The scriptizing means 1607 and the script storage means 1604 perform the same operation as described above (Steps 1710 to 1711). The script expanding means 1606 performs matching of the knowledge file and the rule base file stored in the script storage means 1604 with the knowledge base file and the rule base file stored subsequently and description of ID in the agent mail is matched to file name of the file stored previously or to ID described in the file name, and these are expanded respectively.

In case there is mismatching, there may be means to resolve it. For example, what is contained in the script storage means 1604 is as shown in FIG. 19. The script executing means 1603 performs the same operation as in the description of Step 406.

Also, the function is expanded to an extent of the expanded script. For example, a destination of circulation is added in this case. Also, the function to delete and add mail address in the knowledge base becomes available for the case of "character string:not present" and the case of "character string:participation". Further, an image 3 is added, which is displayed by the agent when the input of the user is "?". In this way, it is possible to easily perform function expansion (Step 1713).

As described above, in the present embodiment, the script of the agent after moving can be expanded by a script arrived subsequently by the script expanding means. Accordingly, the agent can obtain knowledge base or rule base of the agent itself as necessary or send them to the agent, and it is possible to efficiently cope with dynamic situations at the destination of moving.

6th Embodiment

Figure 20:
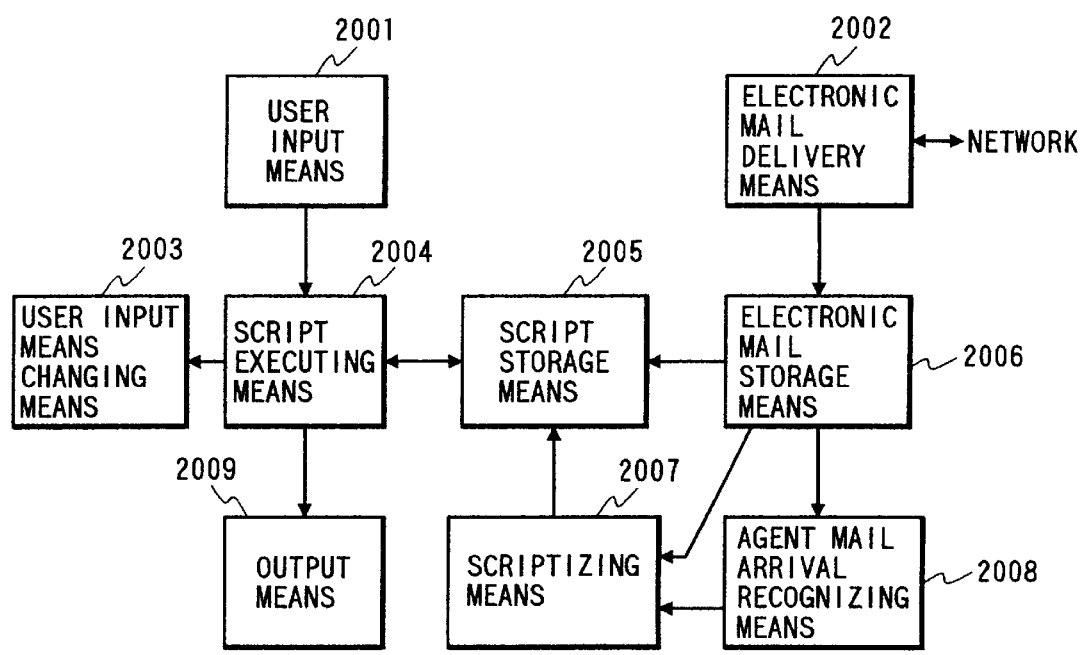
FIG. 20 is a block diagram showing an arrangement of an agent communication system in a sixth embodiment of the present invention.

Description will be given now on a sixth embodiment of the invention referring to FIG. 20. FIG. 20 is a conceptual drawing of an arrangement of an agent communication system of the present embodiment. In FIG. 20, 2002 represents electronic mail delivery means for delivering an electronic mail, 2006 represents electronic mail storage means for storing the delivered electronic mail, 2008 represents agent mail arrival recognizing means for recognizing description of an agent data from the electronic mail arrived at the electronic mail storage means 2006, 2007 represents scriptizing means for extracting the agent data from the electronic mail in the electronic mail storage means 2006 at a notification from the agent mail arrival recognizing means 2008 and for converting it to a script, 2005 represents script storage means for storing the script, 2004 represents script executing means for executing the script stored in the script storage means 2005, and 2001 represents user input means for performing input to the script executing means.

Reference numeral 2003 represents user input means changing means for providing a user interface suitable for environment or a user interface suitable for the user to the user input means 2001 at a notification from the script executing means 2004, and 2009 represents output means for performing output of the script executing means 2004.

Figure 21:
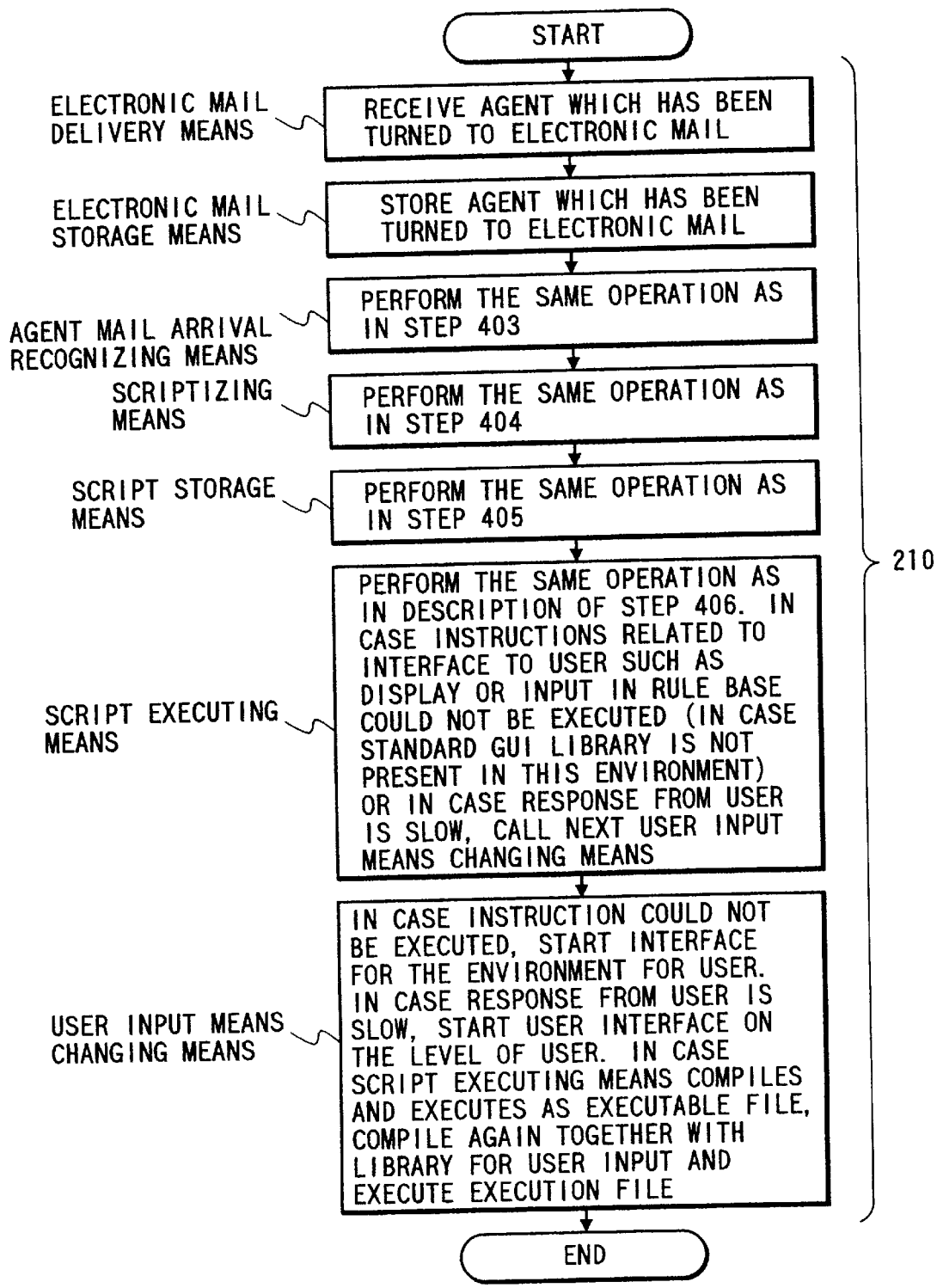
FIG. 21 is a flow chart showing a procedure of agent communication in the sixth embodiment.

For the agent communication system with the above arrangement, description will be given on the operation. FIG. 21 shows an operating procedure of the agent communication system. Description will be given below on a system for asking conveniences and its operation referring to FIG. 21.

First, the electronic mail delivery means 2002 receives an agent, which has been turned to an electronic mail (Step 2101). The electronic mail storage means 2006 stores the agent, which has been turned to the electronic mail. Here, it is supposed that the stored description is a description shown in FIG. 3(*a*), for example. The agent mail arrival recognizing means 2008, the scriptizing means 2007, and the script storage means 2005 perform the same operation as described above (Steps 2103 to 2105). The script executing means 2004 performs the same operation as in Step 406. In case an instruction relating to the interface for the user such as an instruction "display" or "input" in the rule base cannot be executed (in case a standard GUI library is not present in this environment) or in case response from the user is slow, the next user input means changing means 2003 is called.

In case the instruction could not be executed, the user input means changing means 2003 starts an interface for the environment for the user. The interface for the environment includes the interface usable and adapted for the environment, i.e. button, pen input, touch panel, keyboard input, etc. such as voice input/output, picture or image input/output, graphical user interface, etc. In case the response from the user is slow, the user interface at the level of the user is started. For example, to a person who cannot use keyboard, graphical interface or voice input is provided.

In case the script executing means executes as an executable file after compiling, it is complied again and execution file is executed including the library for user input.

Here, the interface is selected in the environment where the agent has moved, while the agent itself may select the user interface.

As described above, in the present embodiment, there is provided user input means changing means, which can change the interface for the user at the destination of moving. Accordingly, it is possible to provide the interface to the user in accordance with the environment at the destination of moving of the agent or to provide a user interface suitable for the level of the user.

7th Embodiment

Figure 22:
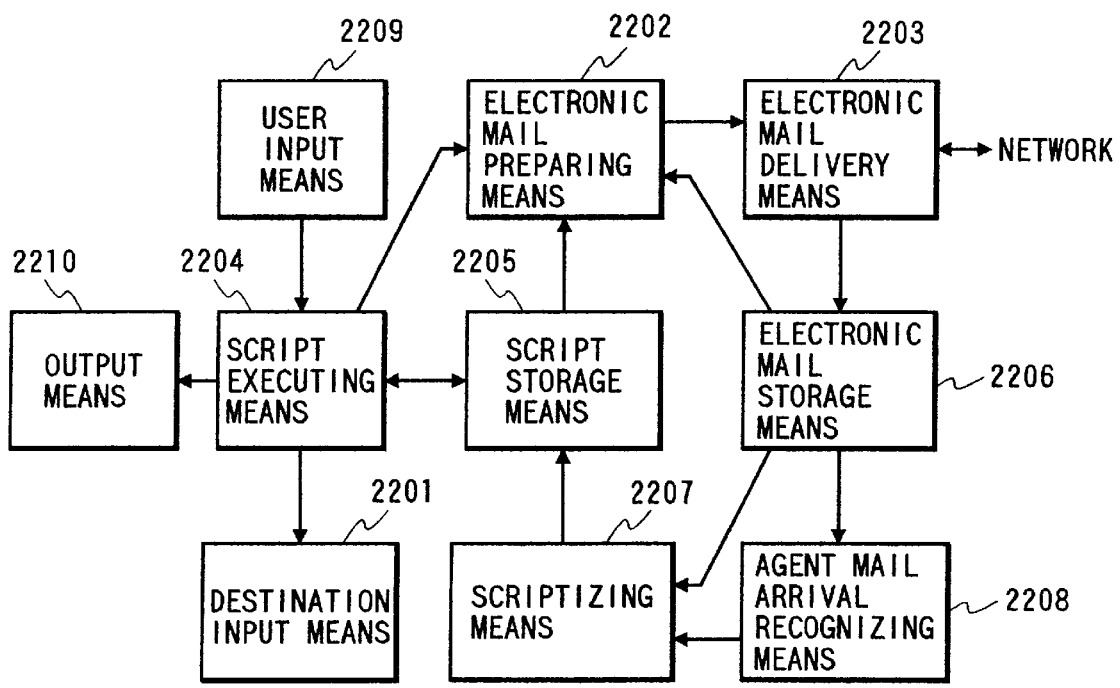
FIG. 22 is a block diagram showing an arrangement of an agent communication system of a seventh embodiment of the present invention.

Description will be given now on a seventh embodiment of the invention referring to FIG. 22. FIG. 22 is a conceptual drawing of an arrangement of an agent communication system of the present embodiment. In FIG. 22, reference numeral 2203 represents electronic mail delivery means for delivering an electronic mail, 2206 represents electronic mail storage means for storing the delivered electronic mail, 2208 represents agent mail arrival recognizing means for recognizing description of an agent data from the electronic mail arrived at the electronic mail storage means 2206, 2207 represents scriptizing means for extracting the agent data from the electronic mail in the electronic mail storage means 2206 at a notification from the agent mail arrival recognizing means 2208 and for converting it to a script, 2205 represents script storage means for storing the script, 2204 represents script executing means for executing the script stored in the script storage means 2205, 2209 represents user input means for inputting the user to the script executing means 2204, 2210 represents output means for performing output to the script executing means 2204, 2202 represents electronic mail preparing means for preparing an electronic mail from data of the script storage means 2205 or the electronic mail storage means 2206 at a notification from the script executing means 2204 and for sending the prepared electronic mail to the electronic mail delivery means 2203, and 2201 represents destination input means for inputting the destination to the script executing means 2204.

Figure 23:
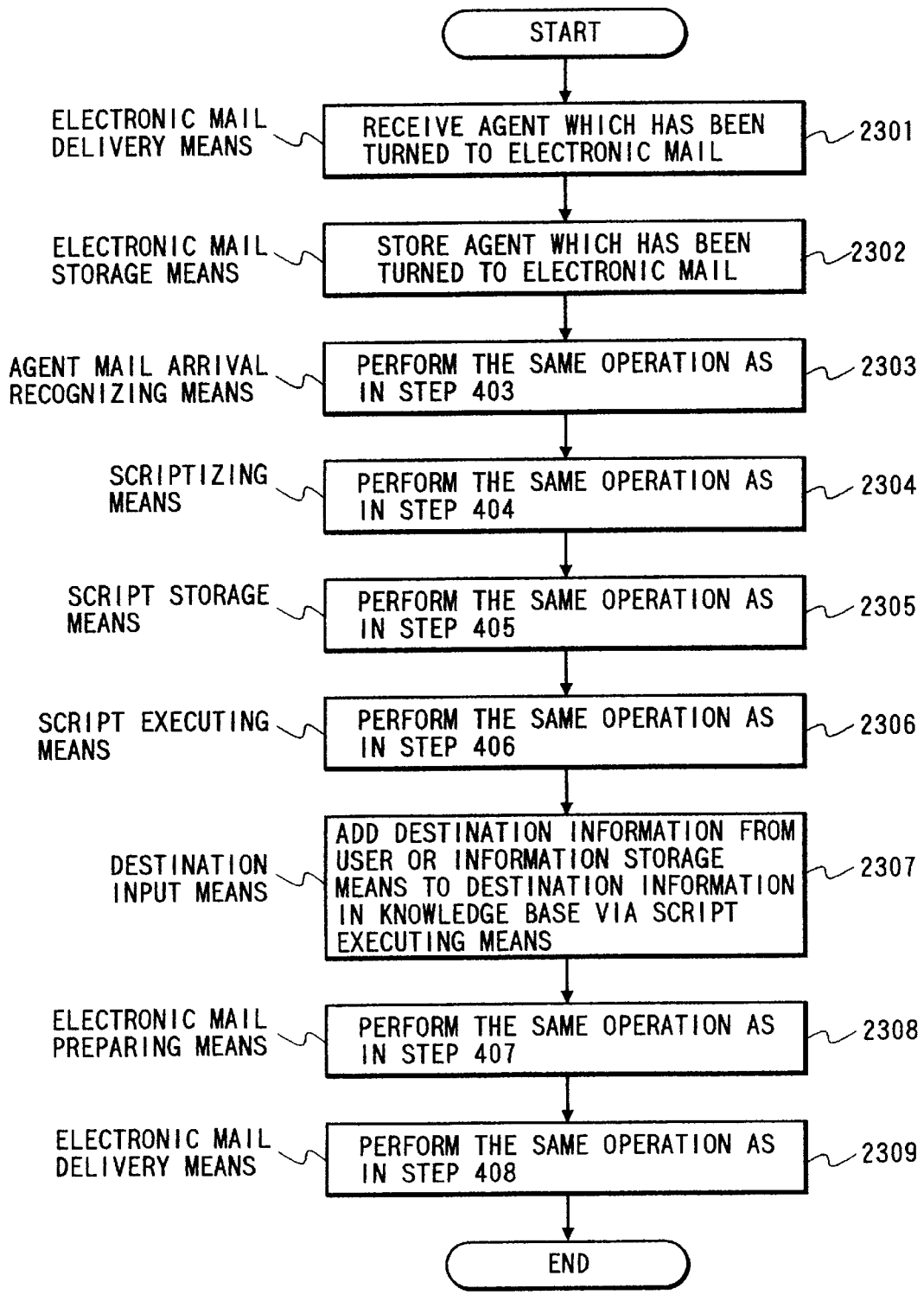
FIG. 23 is a flow chart showing a procedure of agent communication in the seventh embodiment.

For the agent communication system with the above arrangement, description will be given now on its operation. FIG. 23 shows an operating procedure of the agent communication system. Description will be given below on a system for asking conveniences and its operation referring to FIG. 23.

Figures 24, 25:
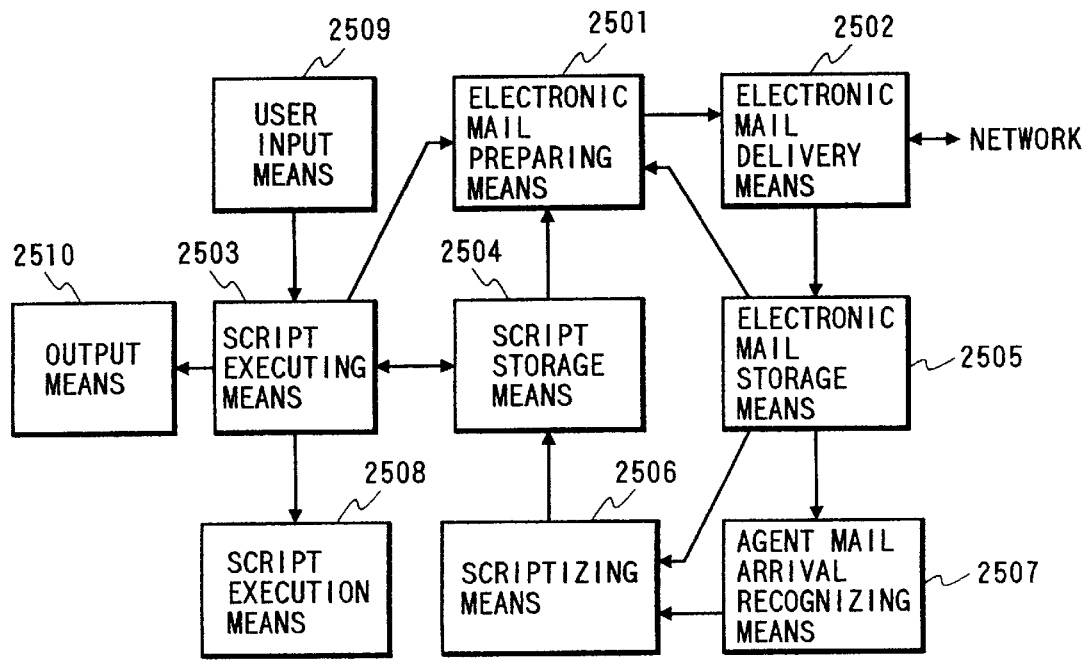
FIG. 24 shows an example of knowledge base file stored in script storage means in the seventh embodiment.
FIG. 25 is a block diagram showing an arrangement of an agent communication system in an eighth embodiment of the invention.

First, the electronic mail delivery means 2203 receives an agent, which has been turned to an electronic mail (Step 2301). Then, the electronic mail storage means 2206 stores the agent, which has been turned to the electronic mail. Here, it is supposed that the stored description is a description as shown in FIG. 9. The agent mail arrival recognizing means 2208, the scriptizing means 2207, the script storage means 2205, and the script executing means 2204 perform the same operation as described above (Steps 2303 to 2306). The destination input means 2201 adds destination information from the user or other agent to the destination information in the knowledge base via the script executing means 2204. For example, the knowledge base file is as shown in FIG. 24.

By adding the destination, it is possible to perform navigation for the agent, and relevant information can be collected one after another. However, if only destinations are inputted, they do not come back for long time, and there may be means to limit the time.

The electronic mail preparing means 2202 and the electronic mail delivery means 2203 also perform the same operation as described above (Steps 2308 and 2309).

As described above, in the present embodiment, the agent can obtain the destination which can be moved at the destination of moving of the agent by the destination input means. Accordingly, it is possible to navigate the agent along a predetermined route and to collect relevant information one after another.

8th Embodiment

Description will be given now on an eighth embodiment of the invention referring to FIG. 25. FIG. 25 is a conceptual drawing of an arrangement of an agent communication system in the present embodiment. In FIG. 25, reference numeral 2502 represents electronic mail delivery means for delivering an electronic mail, 2505 represents electronic mail storage means for storing the delivered electronic mail, 2507 represents agent mail arrival recognizing means for recognizing description of an agent data from the electronic mail arrived at the electronic mail storage means 2505, 2506 represents scriptizing means for extracting the agent data from the electronic mail in the electronic mail storage means 2505 at a notification from the agent mail arrival recognizing means 2507 and for converting it to a script, 2504 represents script storage means for storing the script, 2503 represents script executing means for executing the script stored in the script storage means 2504, 2509 represents user input means for inputting the user to the script executing means 2503, 2510 represents output means for performing output of the script executing means 2503, 2501 represents electronic mail preparing means for preparing an electronic mail from data of the script storage means 2504 or the electronic mail storage means 2505 at a notification from the script executing means 2503 and for sending the prepared electronic mail to the electronic mail delivery means 2502, and 2508 represents another script executing means for fulfilling the same function as 2503.

For the agent communication system with the above arrangement, description will be given now on its operation. FIG. 26 shows an operating procedure of the agent communication system. Description will be given below on a system for asking conveniences and its operation referring to FIG. 26.

First, the electronic mail delivery means 2502 receives an agent, which has been turned to an electronic mail (Step 2601). Then, the electronic mail storage means 2505 stores the agent, which has been turned to the electronic mail (Step 2602). Here, it is supposed that the stored description is a description as shown in FIG. 27, for example. In FIG. 27, the portion different from the above is the portion marked with ◯. The agent mail arrival recognizing means 2507, the scriptizing means 2506, and the script storage means 2504 perform the same operation as described above (Steps 2603 to 2605). The script executing means 2503 performs the same operation as described above. For example, an instruction "display" in the rule base file is executed, and a statement "How is it convenient on January 10?" is displayed, asking the convenience of the user. Then, the instruction "input(text)" is executed, and an interface to input characters to the user is displayed. If there is no response from the user within 10 minutes after arrival of the agent script, the statement "time=10" of the rule base matches, and the instruction "connect(communication port)" is executed. It is connected to a port of inter-process communication with an agent at a local site (another script executing means 2208 and the script storage means 2204), and the instruction "ask("1/10:OK?")" is issued. By collating with schedule information in the knowledge base file in the script storage means 2504 for the local agent instead of the user, it is possible to ask the convenience (Step 2606).

As described above, in the present embodiment, the script executing means has a function to communicate with other script executing means at a local site, and it is possible to perform communication synchronously with an agent, which is at the destination of moving after the agent has moved using the electronic mail or which has moved thereafter.

9th Embodiment

Figure 28:
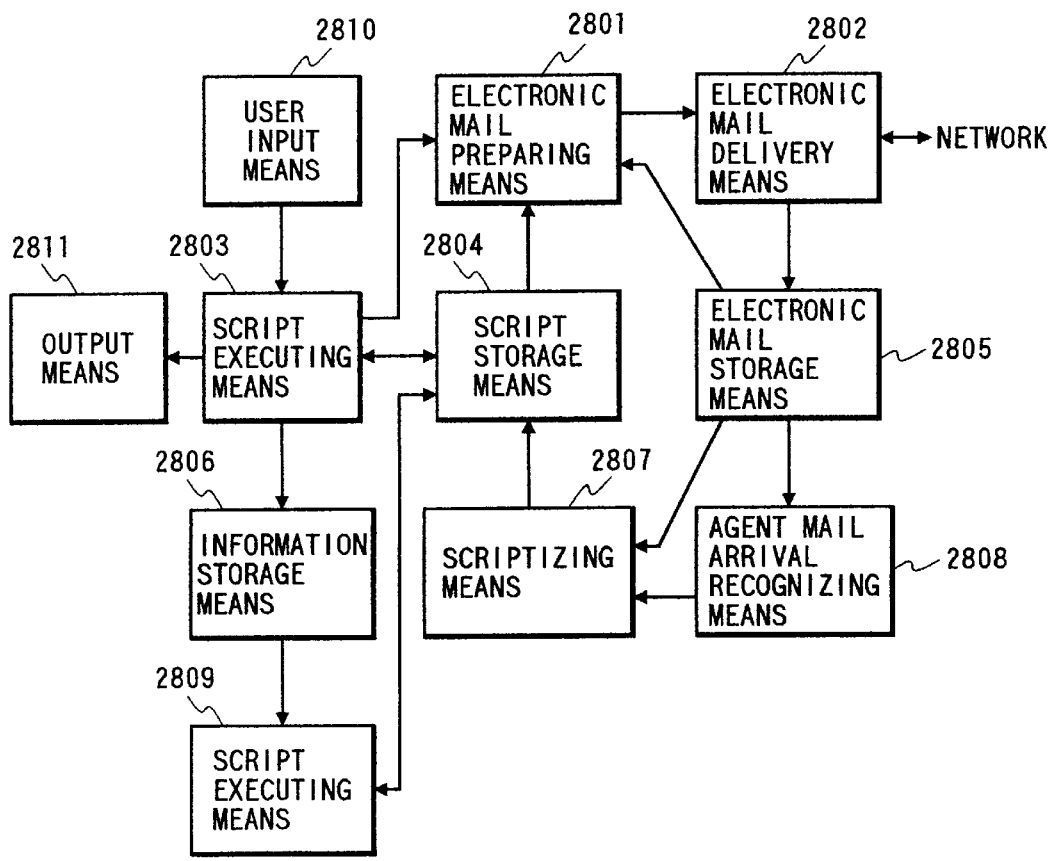
FIG. 28 is a block diagram showing an arrangement of an agent communication system in a ninth embodiment of the invention.

Description will be given now on a ninth embodiment of the invention referring to FIG. 28. FIG. 28 is a conceptual drawing of an arrangement of an agent communication system in the present embodiment. In FIG. 28, reference numeral 2802 represents electronic mail delivery means for delivering an electronic mail, 2805 represents electronic mail storage means for storing the delivered electronic mail, 2808 represents agent mail arrival recognizing means for recognizing description of an agent data from the electronic mail arrived at the electronic mail storage means 2805, 2807 represents scriptizing means for extracting the agent data from the electronic mail in the electronic mail storage means 2805 at a notification from the agent mail arrival recognizing means 2808 and for converting it to a script, 2804 represents script storage means for storing the script, 2803 represents script executing means for executing the script stored in the script storage means 2804, 2810 represents user input means for inputting the user to the script executing means 2803, 2811 represents output means for performing output of the script executing means 2803, 2801 represents electronic mail preparing means for preparing an electronic mail from data of the script storage means 2804 and the electronic mail storage means 2805 at a notification from the script executing means 2803 and for sending the prepared electronic mail to the electronic mail delivery means 2802, 2809 represents another script executing means for fulfilling the same function as 2803, and 2806 represents information storage means for storing information.

Figure 29:
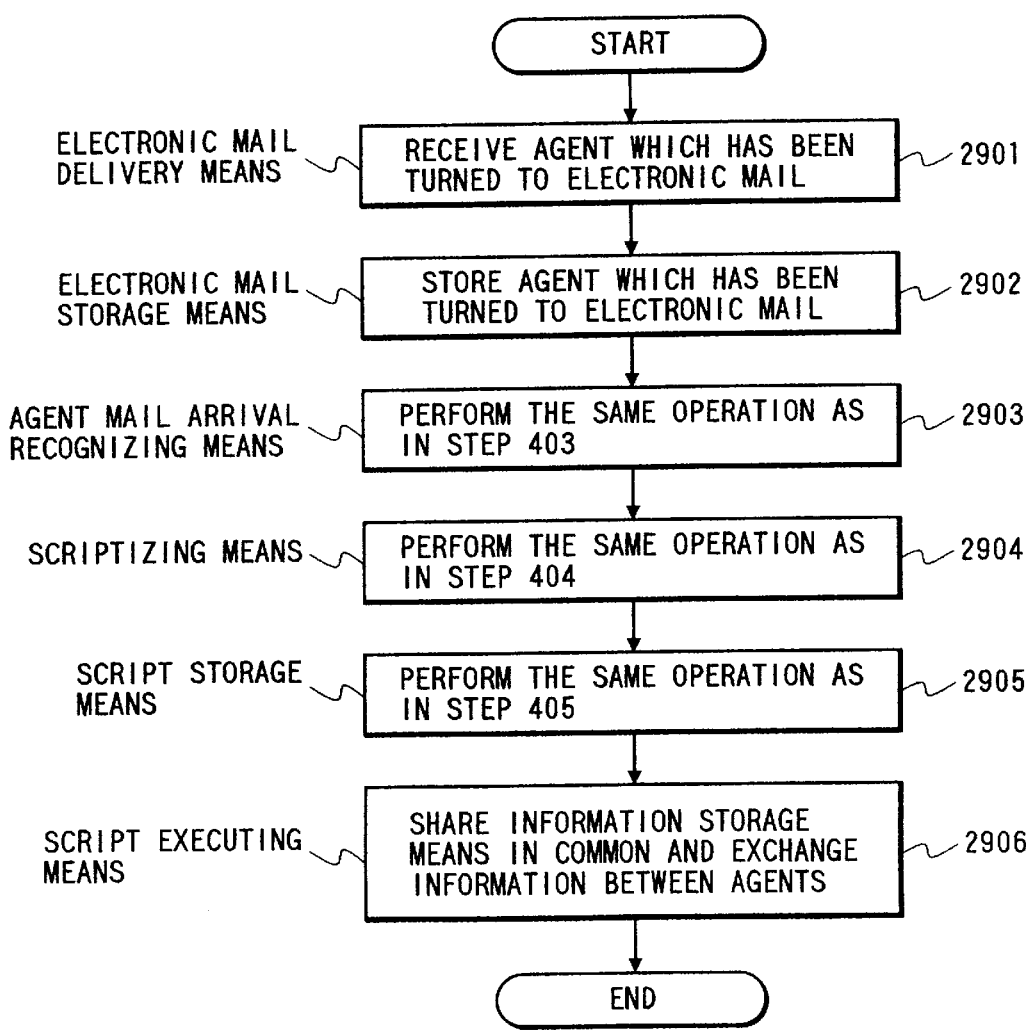
FIG. 29 is a flow chart showing a procedure of agent communication in the ninth embodiment.

For the agent communication system with the above arrangement, description will be given on its operation. FIG. 29 shows an operating procedure of the agent communication system. Description will be given below on a system for asking conveniences and its operation referring to FIG. 29.

First, the electronic mail delivery means 2802 receives an agent, which has been turned to an electronic mail (Step 2901). Then, the electronic mail storage means 2805 stores the agent, which has been turned to the electronic mail. Here, it is supposed that the stored description is a description as shown in FIG. 30, for example. In FIG. 30, the portion different from above is the portion marked with ○.

The agent mail arrival recognizing means 2808, the scriptizing means 2807, and the script storage means 2804 perform the same operation as above (Steps 2903 to 2905). The script executing means 2803 performs the same operation as described above. For example, the instruction "display" in the rule base file is executed, and the message "How is it convenient on January 10?" is displayed, asking the convenience of the user. Then, the instruction "input(text)" is executed, and an interface to input characters is displayed to the user. In case there is no response from the user within 10 minutes after arrival of the agent script, the statement "time=10" on the rule base matches, and the instruction "write(communication place," 1/10:OK?")" is executed, and information is written to the information storage means 2806 at a local site. The agent at local site (another script executing means 2809 and the script storage means 2804) responds when the information is updated and writes a reply to a question "1/10:OK?" in the information storage means 2406. In response to updating of the information, a reply is obtained from the statement "read(communication place, answer)", and at the instruction "write(answer)", the reply is written in the knowledge base file. In this way, the information storage means 2806 is shared in common, and the information can be exchanged.

As described above, in the present embodiment, a plurality of the script executing means can communicate through the information storage means. Accordingly, after the agent has moved using the electronic mail, it is possible to communicate synchronously and non-synchronously with an agent at the destination of moving. Also, it is possible to communicate non-synchronously with an agent, which has moved thereafter.

10th Embodiment

Figure 31:
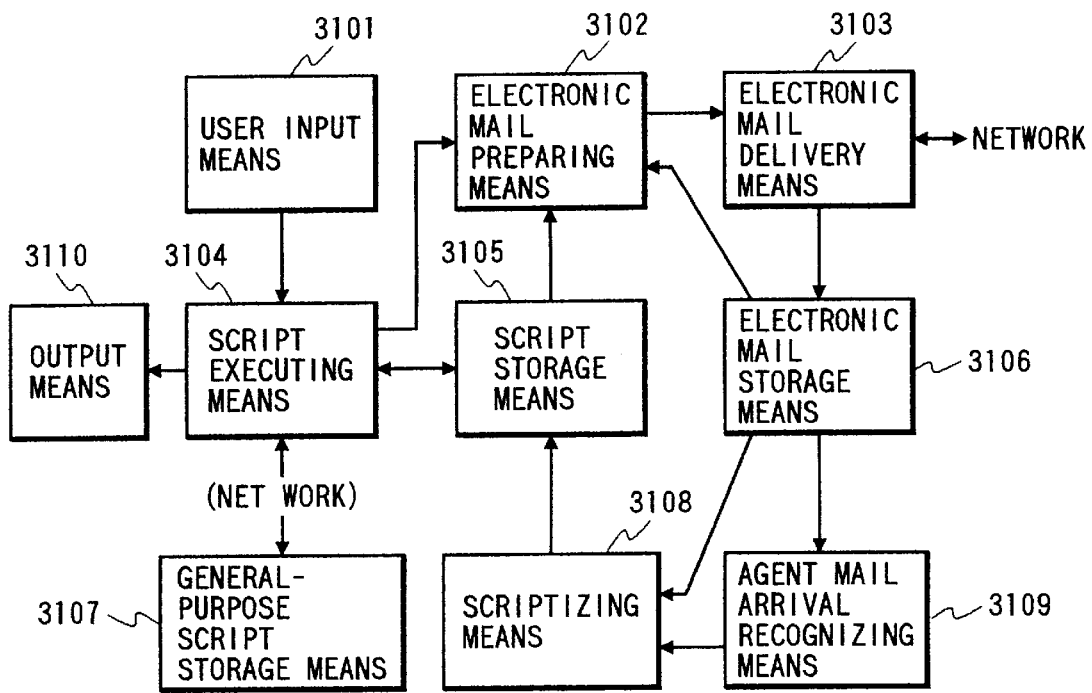
FIG. 31 is a block diagram showing an arrangement of an agent communication system in a tenth embodiment of the invention.

Description will be given on a tenth embodiment of the invention referring to FIG. 31. FIG. 31 is a conceptual drawing of an arrangement of an agent communication system of the present embodiment. In FIG. 31, reference numeral 3103 represents electronic mail delivery means for delivering an electronic mail, 3106 represents electronic mail storage means for storing the delivered electronic mail, 3109 represents agent mail arrival recognizing means for recognizing description of an agent data from the electronic mail arrived at the electronic mail storage means 3106, 3108 represents scriptizing means for extracting the agent data from the electronic mail in the electronic mail storage means 3106 at a notification from the agent mail arrival recognizing means 3109 and for converting it to a script, 3105 represents script storage means for storing the script, 3104 represents script executing means for executing the script stored in the script storage means 3105, 3102 represents electronic mail preparing means for preparing an electronic mail from data of the script storage means 3105 and the electronic mail storage means 3106 at a notification from the script executing means 3104 and for sending the prepared electronic mail to the electronic mail delivery means 3103, 3101 represents user input means for inputting the user to the script executing means 3104, 3110 represents output means for performing output of the script executing means, and 3107 represents general-purpose script storage means for storing a general-purpose script.

For the agent communication system with the above arrangement, description will be given on the features different from the operation as described above and on operation of the script executing means 3104. The script executing means 3104 searches an instruction from the user input means 3101 from the rule base file of the script storage means 3105. If there is an instruction, an operation to the instruction is executed. In this case, the information of the knowledge base file may be utilized, added or deleted, and the information of the rule base may be added or deleted.

In case there is no instruction from the user input means 3101 in the rule base file in the script storage means 3105 or in case there is no information in the knowledge base file, it is searched from the general-purpose script storage means 3107. In case the agent has moved, it is searched from the general-purpose script storage means 3107 at remote site by utilizing means such as inter-process communication. When a rule base file or a knowledge base file is found, which contains the desired rule or knowledge, it is added or overwritten to the corresponding file in the script storage means 3105. In case the agent has moved, it is transferred to the script storage means at the destination of moving.

Figure 32:
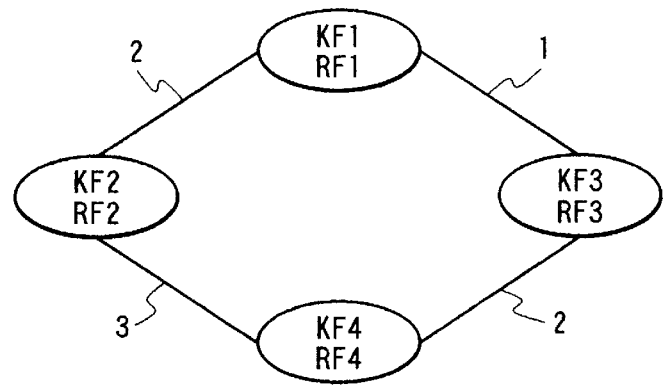
FIG. 32 is a conceptual drawing of data stored in general-purpose script storage means in the tenth embodiment.

The general-purpose script storage means has a graphic structure as shown in FIG. 32. Here, the rule base file is abbreviated as RF, and the knowledge base file is abbreviated as KF. On each of arcs between the files, degree of association is indicated by numerical value. The script executing means performs retrieval, for example, from nodes of KF1 and RF1, and retrieval is shifted to the other nodes. In this case, the numerical values of the degree of association on each of the arcs between nodes are summed up, and retrieval is performed from the lower value. Within the range of the numerical value of a certain degree of association, data are obtained from node, which comprises the rule base file and the knowledge base file. Because a node related to the original node can be retrieved by this method, it is possible to efficiently utilize the rule base file or the knowledge base file as necessary. If it is overwritten on each of the files in the script storage means, the instruction of the user can be more efficiently interpreted.

In case there is the information taught from the user is present in the knowledge base file or the rule base file, the information can be linked to the node in use with a certain degree of association by the general-purpose script storage means and is registered. As a result, the storage means can be expanded. Even in case the agent has moved, there is no need to send a large amount of the rule base files or the knowledge base files at one time, and it is very efficient.

If the information in the general-purpose script storage means has the same arrangement everywhere or ID is added to the same information, it can be used as common knowledge or common rule between the user and the agent or between the agents, and efficient sharing of information can be achieved by exchanging information using means such as ID. On the contrary, in case the information in the general-purpose script storage means is different at each moving site, the agent can be easily adapted if the agent uses the general-purpose script storage means at the destination of moving.

For example, communication with the user or the agent can be performed more smoothly.

As described above, in the present embodiment, a set of rule base and the knowledge base is structurally formed as node with a certain degree of association in the general-purpose script storage means, and the agent can execute using the data to an extent as necessary by utilizing the degree of association. Accordingly, the agent can procure and select the knowledge or the rule base as necessary and can efficiently operate at the destination of moving.

11th Embodiment

Figure 33:
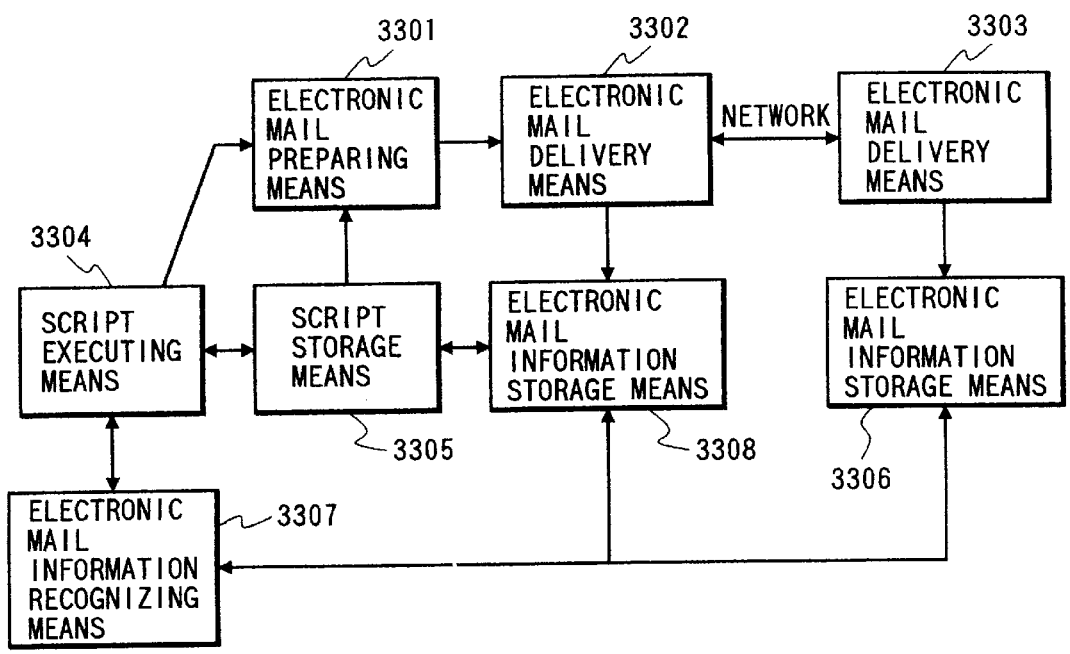
FIG. 33 is a block diagram showing an arrangement of an agent communication system in an eleventh embodiment of the invention.
Figure 34:
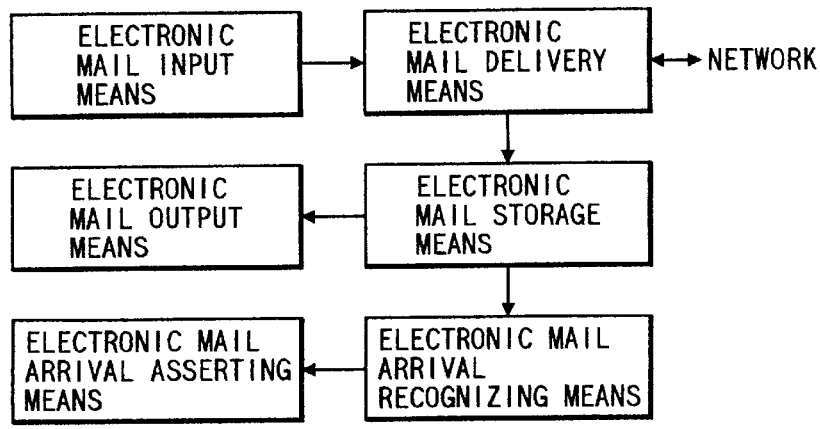
FIG. 34 is a block diagram showing an arrangement of a conventional type electronic mailing system.

Description will be given now on an eleventh embodiment of the invention referring to FIG. 33. FIG. 33 is a conceptual drawing of an arrangement of an agent communication system in the present embodiment. In FIG. 33, reference numerals 3302 and 3303 each represents electronic mail delivery means for delivering an electronic mail, 3306 represents electronic mail information storage means for storing an information requested by a user, 3307 is electronic mail information recognizing means for checking information in the electronic mail information storage means 3306 and 3308, 3304 represents script executing means for notifying electronic mail preparing means 3301 at a notification from the electronic mail information recognizing means 3307, 3305 represents script storage means for storing a script, and 3301 represents electronic mail preparing means for preparing an electronic mail based on information in the script storage means 3305 and destination information obtained by the electronic mail information recognizing means 3307 at a notification from the script executing means 3304.

For the agent communication system with the above arrangement, description will be given below on a system for asking conveniences and its operation.

First, the electronic mail delivery means 3303 receives an electronic mail. Then, the electronic mail information storage means 3306 picks up the electronic mail or information in the electronic mail and stores it. For example, it is supposed here that the following electronic mail is stored:

From: tsuyoshi@trl.mei.co.jp

Subject: wants to know about the most up-to-date television

Date: Mon, Jan. 08, 1996 18:00:00 JST

To: matsushita@trl.mei.co.jp

The electronic mail information recognizing means 3307 checks description of the electronic mail or information in the electronic mail stored in the electronic mail information storage means 3306 or 3308. For example, if it is supposed that character string of "television" is checked, when the "television" as mentioned in "Subject:wants to know about the most up-to-date television" is found, it is transmitted to the script executing means.

Also, from the statement "From: tsuyoshi@trl. mei.co.jp", the information "tsuyoshi@trl.mei.co.jp" is obtained, and this is delivered to the script executing means 3304. The script executing means 3304 performs the same operation as in FIG. 4. However, it is not an instruction from the user, but it is transferred to the destination of the electronic mail via the electronic mail transfer means 3302 using a notification from the electronic mail information recognizing means 2807 as trigger. Then, services such as explanation on functions of the television, which has been turned to a script, are performed interactively under the transmitter of the electronic mail.

As described above, in the present embodiment, the agent is driven by the electronic mail arrival recognizing means. It is not that the user searches necessary information, but by simply sending the request of the user to a predetermined destination by electronic mail, it is possible to receive an agent, which can not only provide the information but also can explain the information interactively.

As described above, according to the present invention, the agent can update the knowledge base or the rule base of the agent itself, and it is possible to cope with dynamic situations at the destination of moving or to operate intelligently. Also, the agent can collect information requested by the user using the knowledge base and the rule base. In particular, it is possible to obtain not only global information registered in the data base but also local information which cannot be obtained publicly.

Also, after the agent has moved using the electronic mail, it is possible to synchronously communicate with the other agent or the other user or server on the network, and new information can be obtained at real time. Further, after the agent has moved using the electronic mail, it is possible to synchronously communicate with an agent, which is at the destination of moving or which has moved thereafter.

Further, it is possible to non-synchronously communicate with an agent, which is at the destination of moving or which has moved thereafter.

Also, by placing a plurality of agents and applications on the electronic mail, it is possible to perform parallel processing of the request of the user or to provide presentation using a plurality of agents and applications at one time to the user.

Because the knowledge base or the rule base of the agent itself can be procured when necessary and can be sent to the agent, it is possible to cope with dynamic situations efficiently at the destination of moving. Further, it is possible to provide an interface for the user in accordance with the environment at the destination of moving or an interface complying with the level of he user.

Because the agent can be navigated along a predetermined route by obtaining a movable destination at the destination of the moving of the agent, it is possible to collect relevant information one after another.

Because the agent can procure and select the knowledge base and the rule base as necessary, it is possible to efficiently cope with dynamic situation at the destination of moving. It is not that the user searches necessary information, but by simply sending the request of the user to a predetermined destination by electronic mail, it is possible to receive an agent, which can not only provide the desired information but also can explain the information interactively. It should be understood that the foregoing relates to only preferred embodiments of the present invention, and that it is intended to cover all changes and modifications of the embodiments of the invention herein used for the purpose of the disclosure which do not departs from the spirit of the invention.

What is claimed is:

1. An agent communication system, comprising means for transmitting and receiving an agent, which has been turned to an electronic mail or to a transfer data, using knowledge description and behavioral description as elements, and means for identifying the agent from the received transfer data or the electronic mail and for executing the knowledge description or the behavioral description of the agent, wherein a description for dynamically changing the behavioral description or the knowledge description as behavioral description of the agent is included as said behavioral description to be transmitted and received, said knowledge description and behavioral description being declaratory, and said behavioral description being described as a style of if-then rule, said declaratory description being dynamically changeable.

2. An agent communication system, comprising electronic mail delivery means for delivering an electronic mail, electronic mail storage means for storing the delivered electronic mail, agent mail arrival recognizing means for recognizing description of an agent data from the electronic mail arrived at the electronic mail storage means, scriptizing means for extracting the agent data from the electronic mail in the electronic mail storage means at a notification from the agent mail arrival recognizing means and for converting it to a script, script storage means for storing the script, script executing means for executing the script stored in the script storage means, output means for performing output from the script executing means, and electronic mail preparing means for preparing an electronic mail from data of the script storage means and the electronic mail storage means at a notification from the script executing means and for sending the prepared electronic mail to the electronic mail delivery means, said script including declaratory knowledge description and declaratory behavioral description, said behavioral description being described as a style of if-then rule, said declaratory description being dynamically changeable.

3. An agent communication system according to claim 1, wherein said system comprises a function to collect information from an information source at the destination of moving as behavioral description of the agent.

4. An agent communication system according to claim 2, wherein there are provided a plurality of script executing means and information storage means for storing information, whereby said plurality of script executing means perform communication non-synchronously between the script executing means via input and output of information to and from said information storage means.

5. An agent communication system according to claim 1, wherein the agent has functions to communicate with other agent or server at the destination of moving.

6. An agent communication system according to claim 2, wherein said script executing means comprises means for communicating with other server connected via the network or other script executing means in accordance with behavioral description of the agent.

7. An agent communication system according to claim 1, wherein the agent being turned to an electronic mail or a transfer data comprises a plurality of agents.

8. An agent communication system according to claim 2, wherein there is provided electronic mail dividing means for dividing an electronic mail, which is stored in the electronic mail storage means and contains a plurality of agent data, and for delivering the divided electronic mails to the scriptizing means for each agent.

9. An agent communication system according to claim 1, wherein, to an agent received and being turned to an electronic mail or a transfer data, there is provided means for expanding said agent by utilizing additional data of said agent received subsequently.

10. An agent communication system according to claim 2, wherein there is provided script expanding means for expanding a script being stored newly in the script storage means to a specified script stored in the script storage means.

11. An agent communication system according to claim 1, wherein the agent has a function to provide a user interface in accordance with a resource at the destination of moving or with the level of the user.

12. An agent communication system according to claim 2, wherein there is provided user input means changing means for providing a user interface suitable for execution of the script executing means to the user input means.

13. An agent communication system according to claim 1, wherein knowledge description relating to the destination of moving is changed, and the agent determines the destination of moving according to the information.

14. An agent communication system according to claim 2, further comprising destination input means for adding information on new destination to information on destination of the knowledge description of the agent.

15. An agent communication system according to claim 1, wherein the agent has a function to supply knowledge description or behavioral description when these descriptions are in shortage via network from the destination of moving as behavioral description.

16. An agent communication system according to claim 2, wherein the script executing means acquires the knowledge description or the behavioral description when these descriptions are in shortage in the script to be executed from the general-purpose script storage means connected via the network and updates content of the script storage means.

17. An agent communication system according to claim 2, wherein there are provided electronic mail information storage means for storing information of the electronic mail received by the electronic mail delivery means and electronic mail information recognizing means for checking information in said electronic mail information storage means, whereby the script executing means selects the corresponding script from the script storage means in accordance with result of checking of the electronic mail information recognizing means and turns the script to an electronic mail and sends it to the transmitter corresponding to the result of checking.

* * * * *